(12) United States Patent
Nakamura et al.

(10) Patent No.: US 6,496,583 B1
(45) Date of Patent: *Dec. 17, 2002

(54) DIGITAL DATA TRANSFER APPARATUS AND METHOD

(75) Inventors: Akira Nakamura, Kanagawa (JP); Sumihiro Ohkawa, Kanagawa (JP); Hiroshi Takiduka, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,383

(22) Filed: Dec. 28, 1998

Related U.S. Application Data

(63) Continuation of application No. PCT/JP98/01995, filed on Apr. 30, 1998.

(30) Foreign Application Priority Data

Apr. 30, 1997 (JP) .............................. 9-126355

(51) Int. Cl.$^7$ ........................ G06F 13/00; G06F 13/38
(52) U.S. Cl. ....................... 380/268; 710/104; 710/107; 710/126; 710/101
(58) Field of Search ............................ 380/43, 50, 268; 710/101, 104, 105, 107, 126

(56) References Cited

U.S. PATENT DOCUMENTS

| | | | | |
|---|---|---|---|---|
| 4,563,546 A | * | 1/1986 | Glitz | 380/49 |
| 4,984,192 A | * | 1/1991 | Flynn | 710/131 |
| 5,018,165 A | * | 5/1991 | Sohner et al. | 375/202 |
| RE34,650 E | * | 6/1994 | Shimada et al. | 340/825.21 |
| 5,323,463 A | * | 6/1994 | Speiser | 380/9 |
| 5,541,957 A | * | 7/1996 | Lau | 375/258 |
| 5,561,553 A | * | 10/1996 | Marcerou et al. | 359/341 |
| 5,682,376 A | * | 10/1997 | Hayashino et al. | 370/206 |
| 5,687,181 A | * | 11/1997 | Suemura et al. | 714/757 |
| 5,745,528 A | * | 4/1998 | Fimoff et al. | 375/316 |
| 5,745,577 A | * | 4/1998 | Leech | 380/28 |
| 5,805,560 A | * | 9/1998 | Kuroda et al. | 369/126 |
| 5,825,309 A | * | 10/1998 | Matsui et al. | 341/50 |
| 5,894,517 A | * | 4/1999 | Hutchison et al. | 380/268 |

OTHER PUBLICATIONS

Horowitz, Paul, and Winfield Hill, The Art of Electronics, Second edition, 1989, p. 602.*

* cited by examiner

Primary Examiner—Gilberto Barron
Assistant Examiner—Douglas Meislahn
(74) Attorney, Agent, or Firm—Frommer Lawrence & Haug LLP; William S. Frommer; Glenn F. Savit

(57) ABSTRACT

A converting processing block (4B/5B CONVERTER & ARB. SIGNAL CONVERTER) functions as a 4 bit/5 bit converting unit for performing 4 bit/5 bit conversion of data and as an arbitration signal converting unit for allocating 5-bit symbols other than 5-bit symbols allocated to data to arbitration signals to enable the sending/reception of the arbitration signals and packet data as 5-bit code data. There are also provided scrambling blocks (SCRAMBLE 1, SCRAMBLE 2) 4A, 4B and descramble blocks (DESCRAMBLE 1, DESCRAMBLE 2) 5A, 5B between the 4 bit/5 bit converting unit and the arbitration signal converting unit on one hand and the input/output port on the other hand to inhibit unneeded radiations in a transmission channel.

4 Claims, 15 Drawing Sheets

DIGITAL DATA TRANSFER APPARATUS AND METHOD

This is a continuation of copending International Application PCT/JP98/01995 having an international filing date of Apr. 30, 1998.

TECHNICAL FIELD

This invention relates to a method and apparatus for transmitting digital data.

BACKGROUND ART

As an interfacing standard supporting high-speed data transfer and real-time transfer, with a view to interfacing for data transfer, there is known the IEEE 1394 high-Performance Serial Bus Standard (IEEE 1394 standard).

This IEEE 1394 standard provides data transfer speeds at 100 Mbps (98.304 Mbps), 200 Mbps (196.608 Mbps) and 400 Mbps (393.216 Mbps). The 1394 port, having an upper order transfer speed, is prescribed to maintain compatibility with respect to its lower order transfer speed. Thus, the data transfer speeds of 100 Mbps, 200 Mbps and 400 Mbps can co-exist on the same network. Also, in the IEEE 1394 standard, a transfer format of the DS-LINK (DATA/STROBE LINK) encoding system is used, in which transfer data are converted into data signals and strobe signals supplementing the data signals, as shown in FIG. 1, and in which clock signals are generated by taking an exclusive OR of the two signals. Referring to the cable structure shown in a cross-sectional view of FIG. 2, there is prescribed a cable 200 of a structure in which a cable obtained on bundling two sets of twist pair lines (signal lines) 202 shielded by first shield layers 201 and power source lines 203 is further shielded by a second shield layer 204.

In the connection system of the IEEE 1394 standard, two types of systems, namely a daisy chain system and a node branched system, may be used. With the daisy chain system, up to a maximum of 16 nodes (an equipment having the 1394 port) can be connected, with the maximum length between the nodes being 4.5 m. By using node branching in combination, as shown in FIG. 3, it is possible to connect up to 63 nodes possible with the standard (physical node addresses).

With the IEEE 1394 standard, connection or disconnection of the above-described cable can be performed with the equipment remaining in operation, that is in the power up state, so that the 1394 network can be re-constructed automatically at a time point of node addition or deletion. The equipment of the node connected at this time can be recognized automatically. The ID or layout of the connected equipments can be managed on the interface.

The constituent elements of the interface conforming to the IEEE 1394 standard as well as the protocol architecture are shown in FIG. 4. The interface of the IEEE 1394 can be classified into the hardware and the firmware.

The hardware is made up of a physical layer (PHY) and a linked layer (link layer).

In the physical layer, signals of the IEEE 1394 standard are driven directly. The link layer has the host interface and the physical layer.

The firmware includes a transaction layer, made up of a management driver for performing actual operations for the interface conforming to the IEEE 1394 standard, and a management layer, made up of a driver for network management conforming to the IEEE 1394 standard, termed Serial Bus management (SBM).

The application layer includes a software used by the user and a management software for interfacing the management layer or the transaction layer.

In the IEEE 1394 standard, the operation of transfer performed in the network is termed a sub-action, for which the following two sorts of the sub-action are prescribed. That is, as the two sub-actions, an asynchronous transmission mode, termed "asynchronous", and a synchronous transfer mode guaranteeing a transfer area, termed "isochronous", are defined. Each sub-action is divided into three parts, and assumes the transfer states termed "arbitration","packet transmission" and "acknowledgment".

In the asynchronous sub-action, asynchronous transfer is used. In FIG. 5, showing the temporal transition state in the transfer mode, the first sub-action gap specifies the idle state of the bus. By monitoring the sub-action gap time, the directly previous transfer comes to a close and judgment is given as to whether or not new transfer is possible.

If the idle state continues for longer than a preset time duration, a decision is given that a node desiring the transfer can use a bus, and arbitration is executed in order to acquire a bus control right. A decision to stop a bus actually is given by a node B positioned at a root, as shown in FIGS. 6a and 6b. The node which has acquired the bus control right by this arbitration then executes data transfer, that is packet transmission. After the data transfer, a node which has received data returns a code ack (code returned to acknowledge the reception) responsive to the received result for the transferred data to execute response acknowledgement. By executing this acknowledgement, both the transmission and receiving nodes can confirm by the ack contents that transfer has been completed regularly.

The sub-action gap, that is the bus idle state, is then resumed to repeat the above transfer operation.

In the isochronous sub-action, transfer of a structure basically similar to the asynchronous transfer is executed. This transfer is executed in preference to the asynchronous transfer in the asynchronous sub-action, as shown in FIG. 7. This isochronous transfer in the isochronous sub-action is executed in preference to asynchronous transfer in the asynchronous sub-action approximately every 8 kHz to set a transfer mode which guarantees a transfer area. This realizes transfer of real-time data.

If isochronous transfer of real-time data is to be executed simultaneously in plural nodes, a channel ID for distinguishing the contents (transmission node) is set in the transfer data in order to receive only the required real-time data.

The physical layer in the above-described IEEE 1394 standard is made up of a physical layer logical block (PHY LOGIC) 102, a selector block (RXCLOCK/DATA SELECTOR) 103, port logic blocks (PORT LOGIC 1, PORT LOGIC 2, PORT LOGIC 3), 104, 105, 106, cable ports (CABLE PORT 1, CABLE PORT 2, CABLE PORT 3) 107, 108, 109 and a clock generating block (PLL) 110, as shown in FIG.8.

The physical layer logical block 102 performs I/O control and arbitration control with the link layer in the IEEE 1394 standard and is connected not only to a link layer controller 100 but also to the selector block 103 and to the port logic ports 104, 105, 106.

The selector block 103 selects data (DATA 1, DATA 2, DATA 3) received via logical blocks 104, 105, 106, connected to the cable ports 107, 108, 109, and reception clocks (RXCLK 1, RXCLK 2, RXCLK 3), and is connected to the physical layer logical block 102 and to the port logic ports 104, 105, 106.

For reception, each set of packet data DATA 1, DATA 2, DATA 3 received via the port logic ports 104, 105, 106 and the reception clocks (RXCLK 1, RXCLK 2, RXCLK 3) is selected to send the received packet data and the reception clocks via cable ports 107, 108, 109 to the physical layer logical block 102. If, for example, the packet data DATA 1 received via the port logical block 104 via cable port 107 and the reception clock RXCLK 1 are selected, the received packet data (DATA 1) and its reception clock RXCLK 1 are sent by the port logical block 104 to the physical layer logical block 102. The packet data selected by the selector block 103 is written by the reception clock in a FIFO memory in the physical layer logical block 102. The packet data written in the FIFO memory is read out by a system clock SYSCLK provided by a clock generating block 110.

The port logical block 104 sends/receives an arbitration signal (ARB.SIGNAL) and data (DATA 1) via cable port 107 and has the function of generating reception clocks (RXCLK 1) from the data signals sent via cable port 107 and its strobe signals. This port logical block 104 is fed during arbitration with an arbitration signal (ARB. SIGNAL) from the physical layer logical block 102.

During data transmission time, the port logical block 104 converts the packet data DATA 1 sent via selector block 103 from the physical layer logical block 102 with transmission clocks TXCLK provided by the clock generating block 110 into serial data which is sent over the cable port 107.

During data reception, the port logical block 104 sends the packet data DATA 1 received over the cable port 107 to the physical layer logical block 102 over the selector block 103 along with the reception clocks (RXCLK 1). If the port logical block 104 is selected by the selector block 103, the packet data (DATA 1) is written in the FIFO memory in the physical layer logical block 102.

The port logical block 105 sends/receives the arbitration signal(ARB. SIGNAL) and data (DATA 2) over a cable port 108 and has the function of generating reception clocks (RXCLK 2) from the data signals sent via cable port 108 and its strobe signals. This port logical block 105 is fed during arbitration with an arbitration signal (ARB. SIGNAL) from the physical layer logical block 102.

During the data transmission time, the port logical block 105 converts the packet data (DATA 2) sent from the physical layer logical block 102 via the selector block 103 by the transmission clocks (TXCLK) provided by the clock generating block 110 into serial data which is sent via cable port 108.

During data reception time, this port logical block 105 sends the packet data (DATA 2) sent from the physical layer logical block 102 over the cable port 108 via selector block 103 to the physical layer logical block 102 along with the reception clocks (RXCLK 2). If this physical layer logical block 102 has been selected by the selector block 103, the packet data (DATA 2) is written by the reception clocks (RXCLK 2) in the FIFO memory in the physical layer logical block 102.

The port logical block 106 sends/receives the arbitration signal (ARB. SIGNAL) and data (DATA 3) over a cable port 108 and has the function of generating reception clocks (RXCLK 3) from the data signals sent via cable port 109 and its strobe signals. This port logical block 106 is fed during arbitration with an arbitration signal (ARB. SIGNAL) from the physical layer logical block 102.

During the data transmission time, the port logical block 106 converts the packet data (DATA 3) sent from the physical layer logical block 102 via the selector block 103 by the transmission clocks (TXCLK) provided by the clock generating block 110 into serial data which is sent via cable port 109.

During data reception time, this port logical block 106 sends the packet data (DATA 3) received via the cable port 109 and via selector block 103 to the physical layer logical block 102 along with the reception clocks (RXCLK 2). If this port logical block 104 has been selected by the selector block 103, the packet data (DATA 1) is written by the reception clocks (RXCLK 1) in the FIFO memory in the physical layer logical block 102.

The cable port 107 drives a twisted paired cable with a signal sent from the port logical block 104, while converting level of the signal sent over the twisted paired cable to send the converted signal to the port logical block 104.

The cable port 108 drives the twisted paired cable with a signal sent from the port logical block 105, while converting level of the signal sent over the twisted paired cable to send the converted signal to the port logical block 105.

The cable port 109 drives the twisted paired cable with a signal sent from the port logical block 106, while converting level of the signal sent over the twisted paired cable to send the converted signal to the port logical block 106.

The clock generating block 110 generates system clocks (SYSCLK) of 49.152 MHz and transmission clocks (TXCLK) of 98.304 MHz from clocks of 24.576 MHz provide by a quartz oscillator 111.

The logical values of the arbitration signal in the physical layer are three values of "1", "0" and "Z", and are generated in accordance with the rule shown in Tables 1 and 2, while being decoded in accordance with the rule shown in Table 3. The value "Z" denotes an inoperative state of a driver.

Of the two sets of the twist pair lines 202, one set of the twist pair lines TPA/TPA* sends a strobe signal (STRB_TX), while receiving the strobe signal (STRB_RX). The signals STRB_TX, DATA_TX, STRB_ENABLE and DATA_ENABLE are used for generating arbitration signals (ARB_A_RX, ARB_B_RX).

TABLE 1

Rule for Generation of Arbitration Signals

| transmission arbitration signal A | driver | | |
|---|---|---|---|
| (ARB_A_TX) | STRB_TX | STRB-ENABLE | memoranda |
| Z | — | 0 | TPA DRIVER: non-operating |
| 0 | 0 | 1 | TPA DRIVER: operating; STROBE: low |
| 1 | 1 | 1 | TPA DRIVER: operating; STROBE: high |

TABLE 2

Rule for Generation of Arbitration Signals

| transmission arbitration signal B (ARB_B_TX) | driver | | |
|---|---|---|---|
| | DATA_TX | DATA_ENABLE | memoranda |
| Z | — | 0 | TPB DRIVER: non-operating |

TABLE 2-continued

Rule for Generation of Arbitration Signals

| transmission arbitration signal | driver | | |
|---|---|---|---|
| B (ARB_B_TX) | DATA_TX | DATA_ENABLE | memoranda |
| 0 | 0 | 1 | TPB DRIVER: operating; DATA: low |
| 1 | 1 | 1 | TPB DRIVER: operating; DATA: high |

TABLE 3

Rule for Decoding Arbitration Signals

| reception arbitration comparison value (ARB_n_RX) | arbitration signal being sent from port (ARB_n_RX) | interpolated arbitration signal (ABR_n) | memoranda "n" is "A" or "B"; this table applies to both signal pair |
|---|---|---|---|
| Z | Z | Z | If this port is receiving Z, the received signal is the same as that sent by the port at the other cable end |
| 0 | Z | 0 | |
| 1 | Z | 1 | |
| Z | 0 | 1 | If comparator is receiving Z when this port is sending 0, other port is sending 1 |
| 0 | 0 | 0 | other port is sending 0 or Z |
| Z | 1 | 1 | other port is sending 0 |
| 1 | 1 | 1 | other port is sending 1 or Z |

Also, in the physical layer, two transmission arbitration signals (ABR_A_TX, ARB_B_TX) are encoded to the line states, using the rule shown in Table 4. These states have different meanings depending on whether signals are sent to a parent node or to the child node, as shown in Table 4.

The parent-child relation in the IEEE 1394 standard is explained. Of the plural nodes connected to the network, there exist several nodes present at an end (leaf). Directly after resetting, each node checks whether or not it itself is a leaf. Whether each node is a leaf is checked by recognition of how many cables are connected to the node itself. Specifically, a node having a sole port or a node having plural ports only one of which is connected is a node. Each leaf makes an inquiry to a node to which it is connected (parent node). The node receiving the inquiry accepts the inquiring node to which it is connected as being a child. A further inquiry is made to a destination of connection from a node for which the parent-child relation has not been set.

In this manner, the parent-child relation in the network is set. Finally, the node whose ports in their entirety serve as parent serves as a root.

TABLE 4

Line States of Arbitration Sent over physical layer

| arbitration transmission | | | |
|---|---|---|---|
| ARB_A_TX | ARB_B_TX | Name of Line States | memoranda |
| Z | Z | IDLE | sent to show gap |
| Z | 0 | TX_REQUEST | sent to parent node to request a bus |
| | | TX_GRANT | sent to a child node when bus is accorded |
| 0 | Z | TX_PARENT_NOTIFY | sent to a parent candidate node in TREE_ID phase |
| 0 | 1 | TX_DATA_PREFIX | sent before packet data or between packet data of connected sub-action |
| 1 | Z | TX_CHILD_NOTIFY | sent to child node to comprehend PARENT NOTIFY |
| | | TX_IDENT_DONE | sent to parent node to show end of SELF-ID phase |
| 1 | 0 | TX_DATA_END | sent after end of packet transfer |
| 1 | 1 | BUS_RESET | sent for bus reconstruction |

In the physical layer, the interpolation arbitration signals (ARB_A, ARB_B) are decoded to the line states in accordance with the rule shown in Table 5 below.

TABLE 5

Line States of Arbitration Signals Received by Physical Layer

| interpolation arbitration signals | | Name of Line | |
|---|---|---|---|
| ARB_A | ARB_B | States | Memoranda |
| Z | Z | IDLE | PHY of connected neighboring node is not in operation |
| Z | 0 | RX_PARENT_NOTIFY | PHY of connected neighboring node is trying to be a child node |
| | | RX_REQUEST_CANCEL | PHY of connected neighboring node has abandoned request |
| Z | 1 | RX_IDENT_DONE | PHY of child node completed SELF-ID phase |
| 0 | Z | RX_SELF_ID_GRANT | PHY of parent node accords bus for SELF-ID |
| | | RX_REQUEST | PHY of child node requests bus |
| 0 | 0 | RX_ROOT_CONTENTION | Both PHY of child node and PHY of connected neighboring node try to be child nodes |
| | | RX_GRANT | PHY of parent node accords bus control |
| 0 | 1 | RX_PARENT_HANDSHAKE | PHY of connected neighboring node comprehends PARENT_NOTIFY |
| | | RX_DATA_END | PHY of connected neighboring node ends data block transmission to set bus free |
| 1 | Z | RX_CHILD_HANDSHAKE | PHY of connected neighboring node comprehends TX_CHILD_NOTIFY |
| 1 | 0 | RX_DATA_PREFIX | PHY of connected neighboring node tries to send packet data or tries to send data after end of transmission of data block |
| 1 | 1 | SBUS_RESET | sent for bus re-construction |

The above-defined IEEE 1394 standard provides necessary conditions for an interface for connecting an image-handling domestic equipment to a computer, so that a variety of equipments, such as audio or visual equipments or personal computers, can be easily connected over a sole cable in a home to construct a household network to permit it facilitated operation of the various equipments.

However, since the IEEE 1394 standard provides that the distance between the interconnected equipments, that is the inter-node cable length, is 4.5 m at the maximum, so that, if a network is to be constructed in a household across plural rooms, it is necessary to provide a large number of nodes only for cable relaying.

Also, if it is desired to elongate the cable without modifying the system of a physical layer in the IEEE 1394 standard, the cable needs to be increased in diameter, thus lowering workability in cable laying for the network, while the cable itself is expensive.

DISCLOSURE OF THE INVENTION

It is therefore an object of the present invention to provide a method and apparatus for transmission of digital serial data in which the inter-node cable length in a digital serial data interface, in which a bus using correct arbitration performed prior to data transfer as in the case of the IEEE 1394 standard, is elongated to enable long-distance transmission.

According to the present invention, there is provided a data transmission apparatus sending and receiving data and control codes including an input/output port, data conversion means for converting data for transmission from a n-bit code to a m-bit code and for converting the received data from the m-bit code to the n-bit code, control signal converting means for converting a transmission control signal for acquisition of use right of a transmission channel connected to the input/output port into a control code composed of a m-bit code other than a m-bit code allocated to data and for converting the received m-bit code into the control signal, scrambling means for performing scrambling on the m-bit control code received from the control signal converting means for reducing unneeded radiations to output the scrambled control code to the input/output port, and descrambling means for descrambling the scrambled signals received via the input/output port to output descrambled signals to the control signal converting means.

According to the present invention, there is also provided a data transmission method including a sending data conversion step for converting data for transmission from a n-bit code to a m-bit code, a reception data converting step for converting the received data from the m-bit code to the n-bit code, a transmission control signal converting step for converting a transmission control signal for acquisition of use right of a transmission channel connected to the input/output port into a control code composed of a m-bit code other than a m-bit code allocated to data and for converting the received m-bit code into the control signal, a scrambling step for performing scrambling on the m-bit control code received from the transmission control signal converting step for reducing unneeded radiations to output the scrambled control code to an input/output port and a descrambling step for descrambling the scrambled signals received via the input/output port.

BEST MODE FOR CARRYING OUT THE INVENTION

Figure 1:
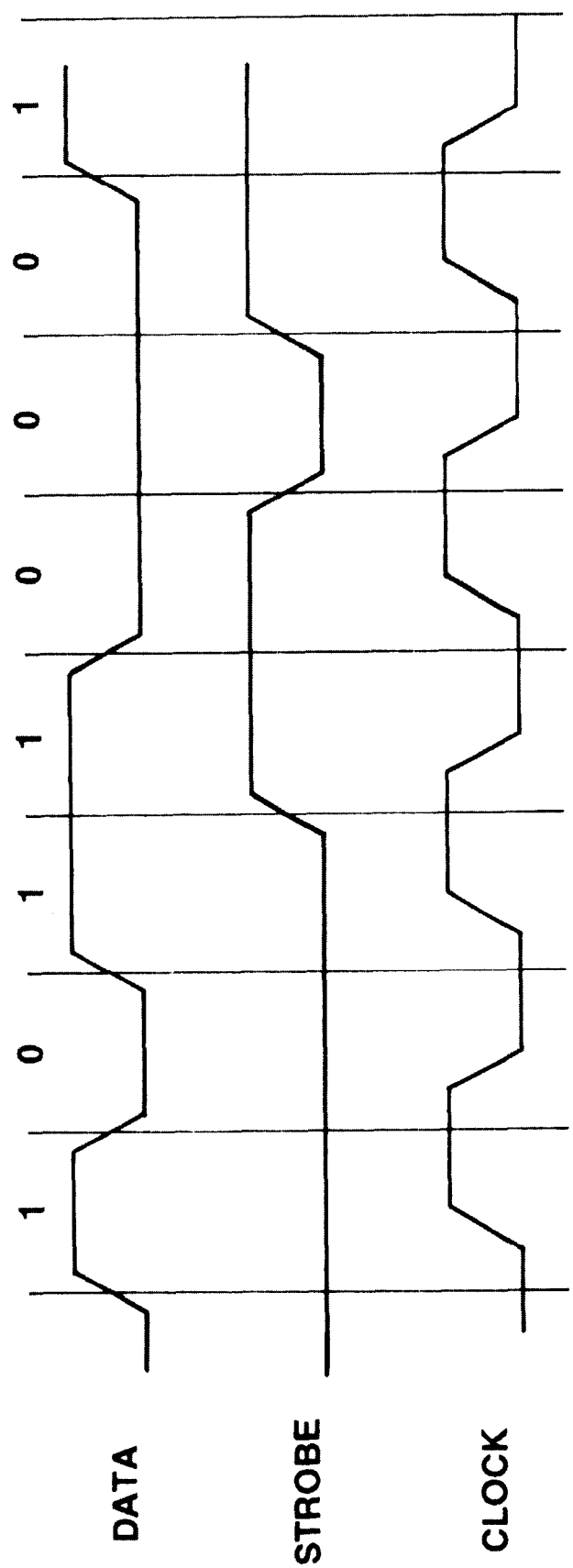
FIG. 1 is a time chart for illustrating a signal structure of transfer data in the IEEE 1394 standard.
Figure 2:
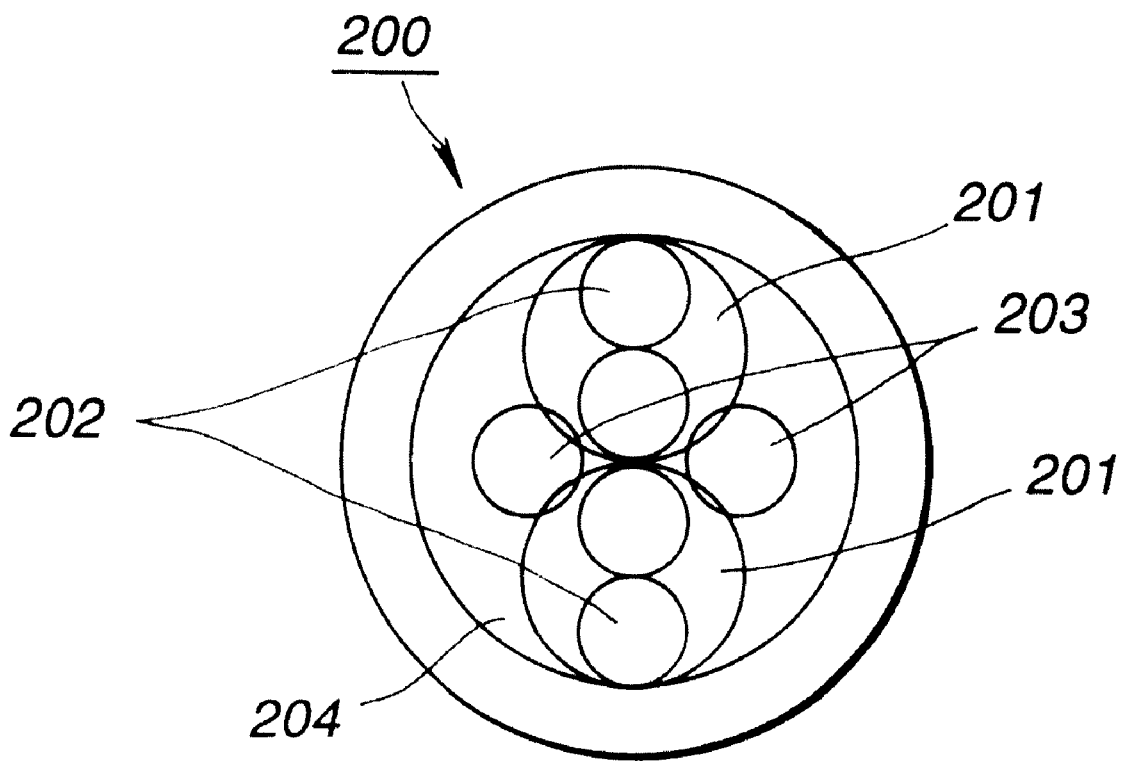
FIG. 2 is a cross-sectional view of a cable prescribed in IEEE 1394 standard.
Figure 3:
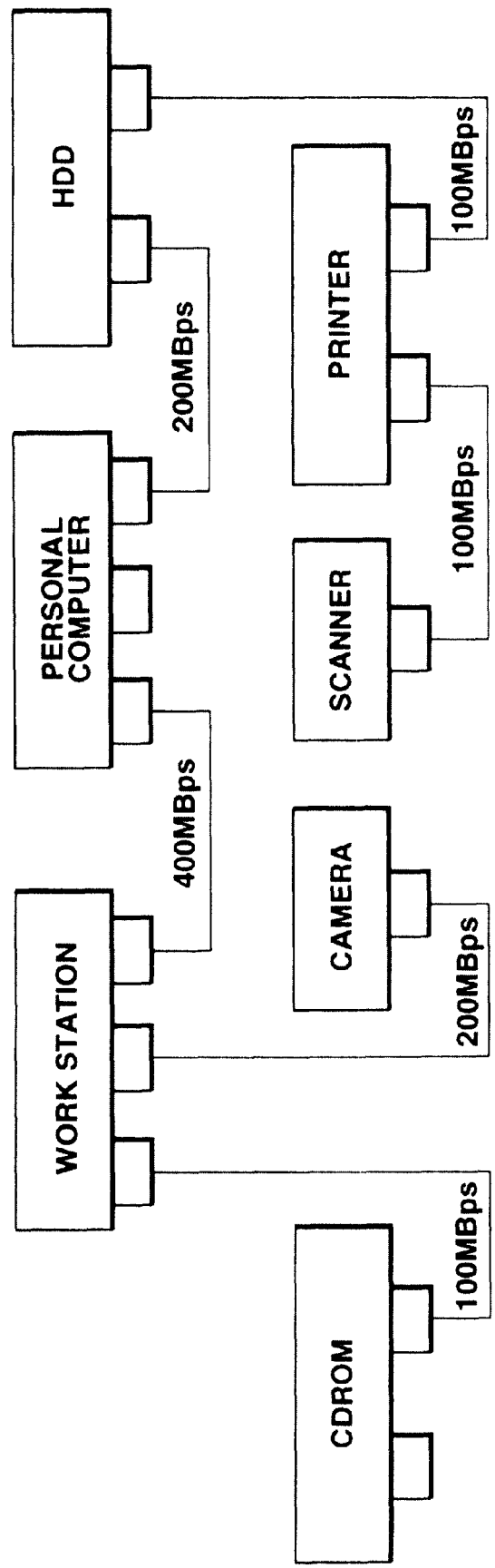
FIG. 3 shows an illustrative structure of a network employing the IEEE 1394 standard.
Figure 4:
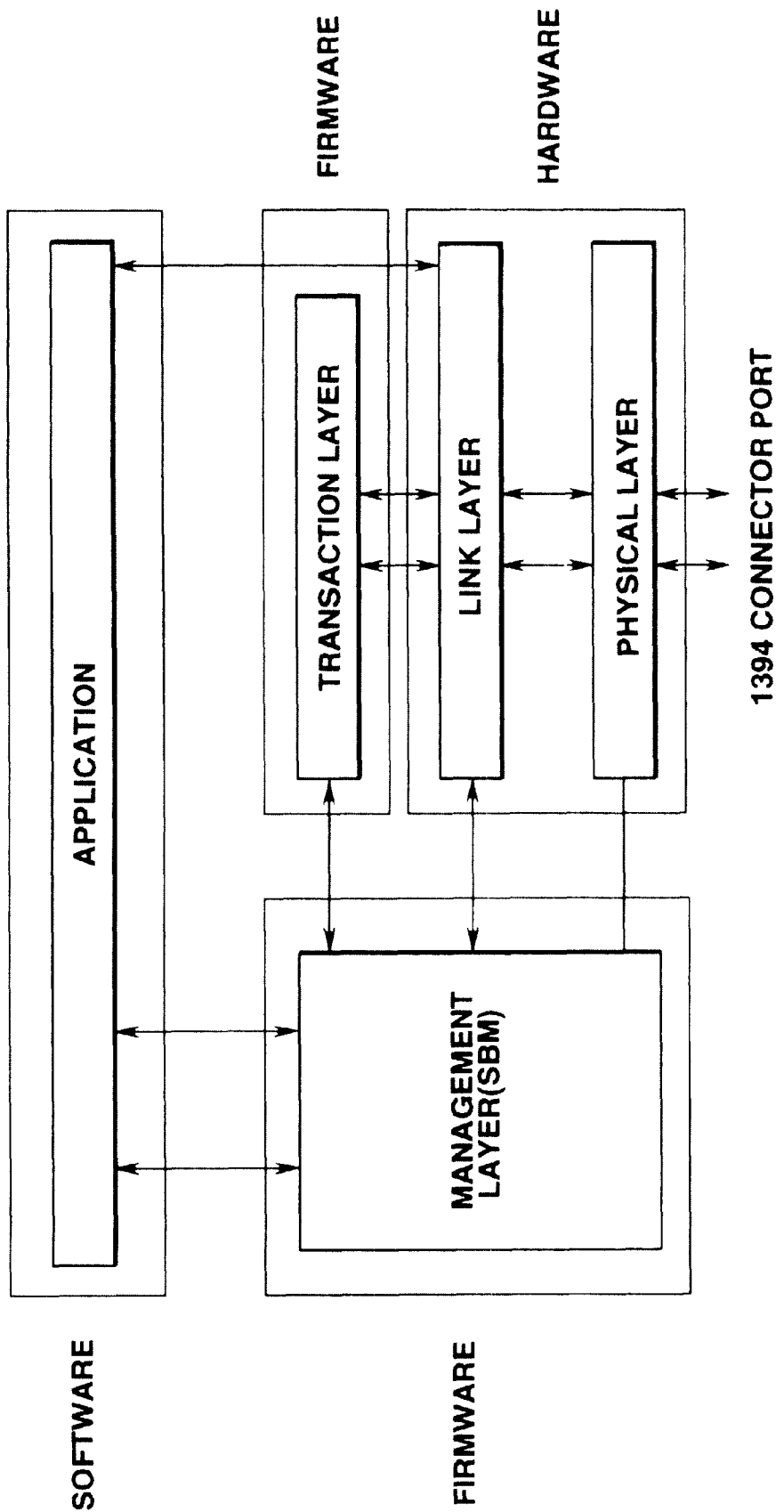
FIG. 4 shows a protocol architecture and an interface conforming to the IEEE 1394 standard.
Figure 5:
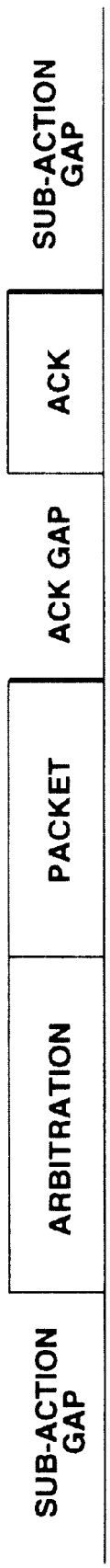
FIG. 5 shows a packet for asynchronous transfer.
Figure 6B:
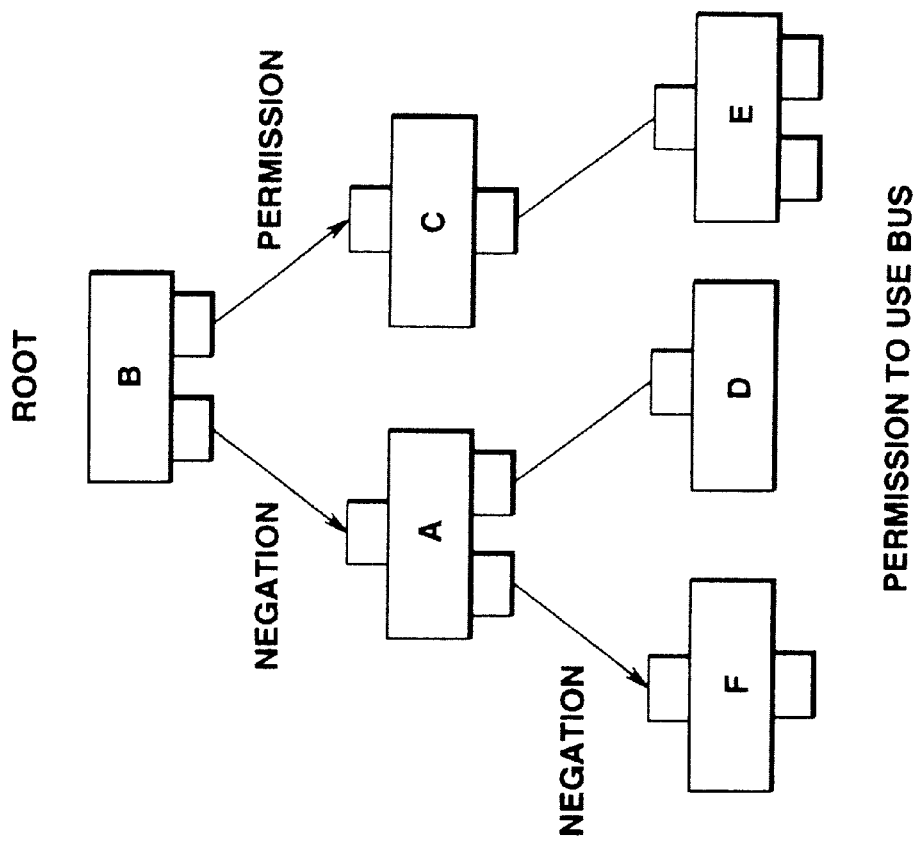
FIG. 6 shows the state of bus use right acquisition by arbitration.
Figure 6A:
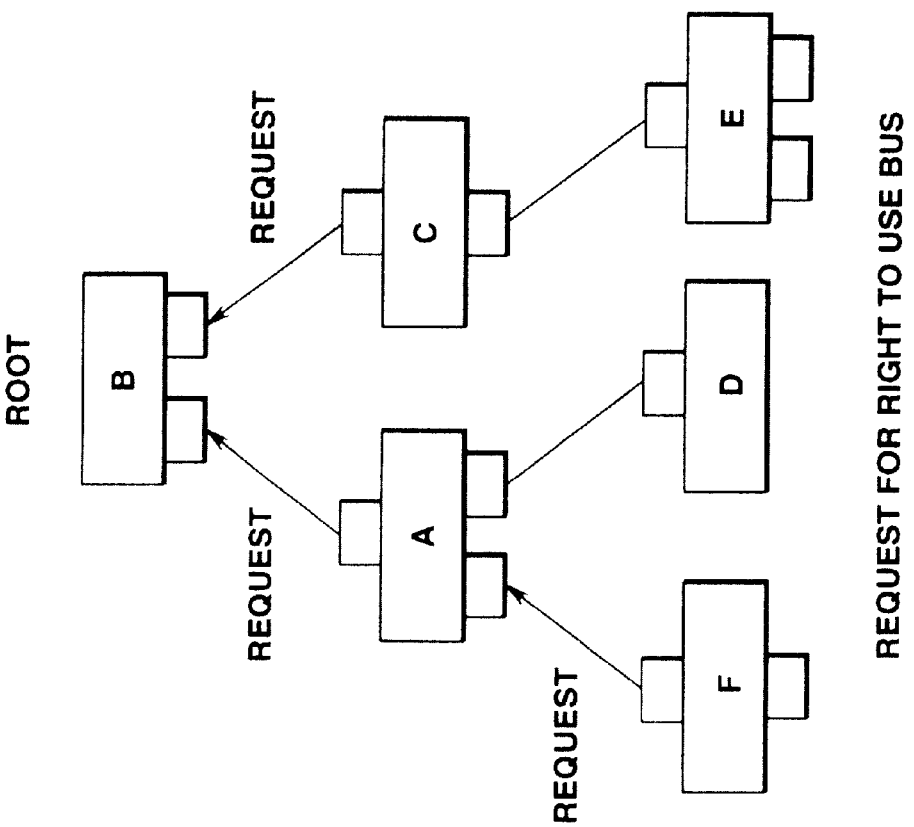
Figure 7:
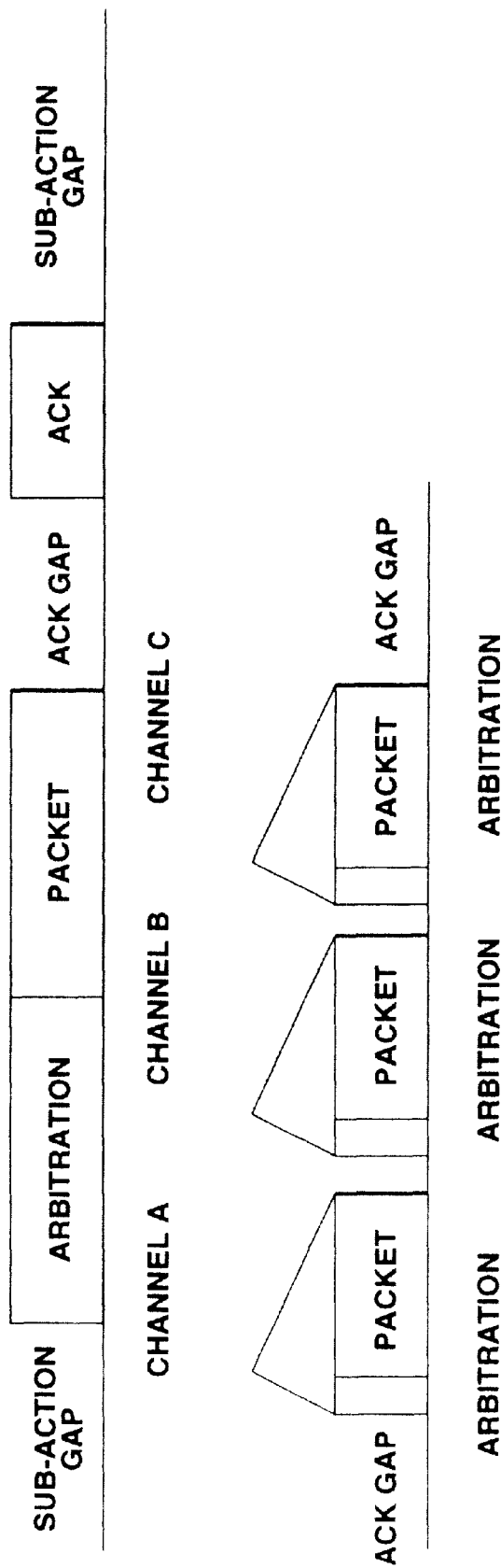
FIG. 7 shows a packet for isochronous transfer.
Figure 8:
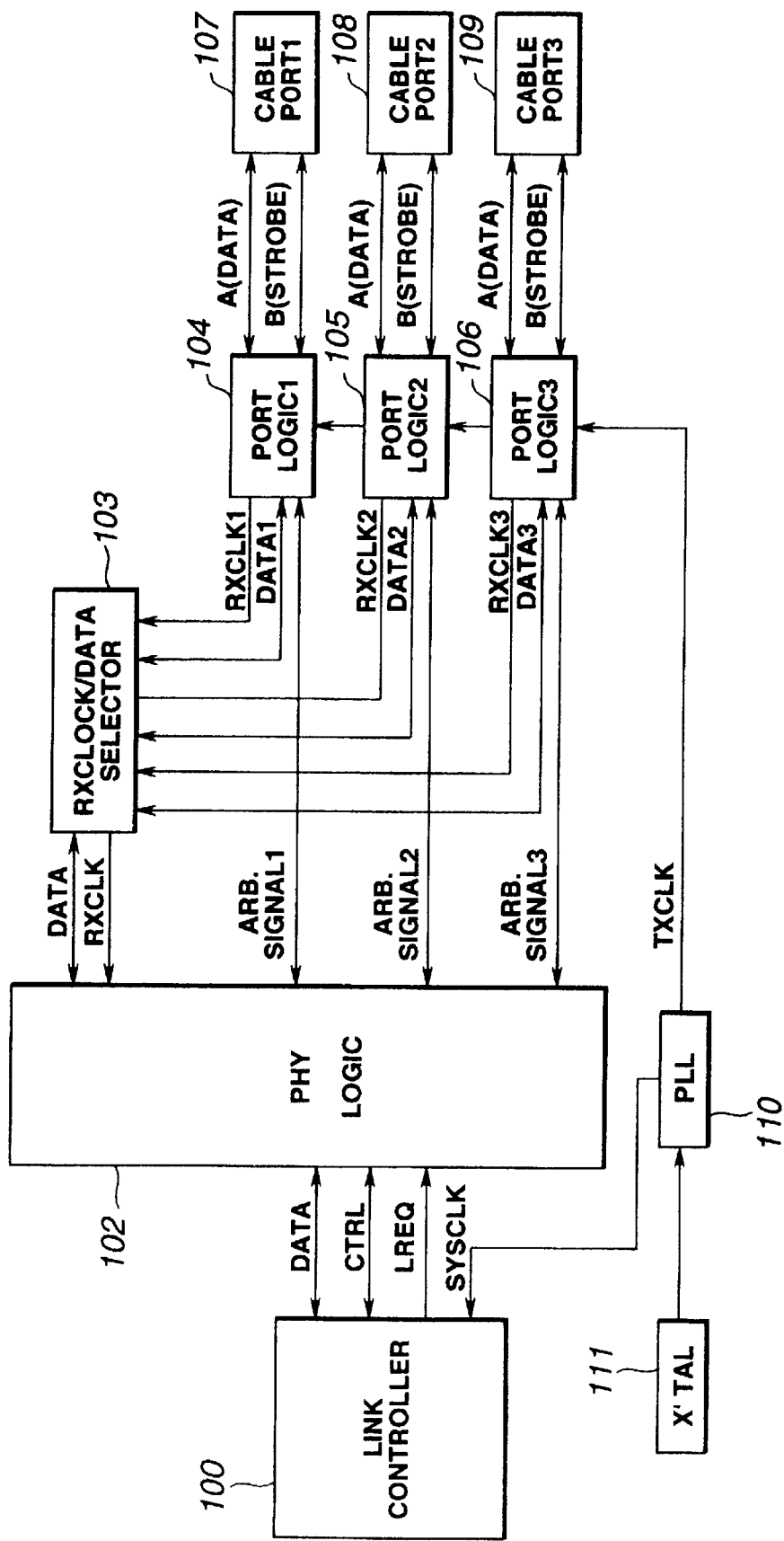
FIG. 8 is a block diagram showing an illustrative structure of a physical layer in the IEEE 1394 standard.

Referring to the drawings, preferred embodiments of the present invention will be explained in detail.

Figure 9:
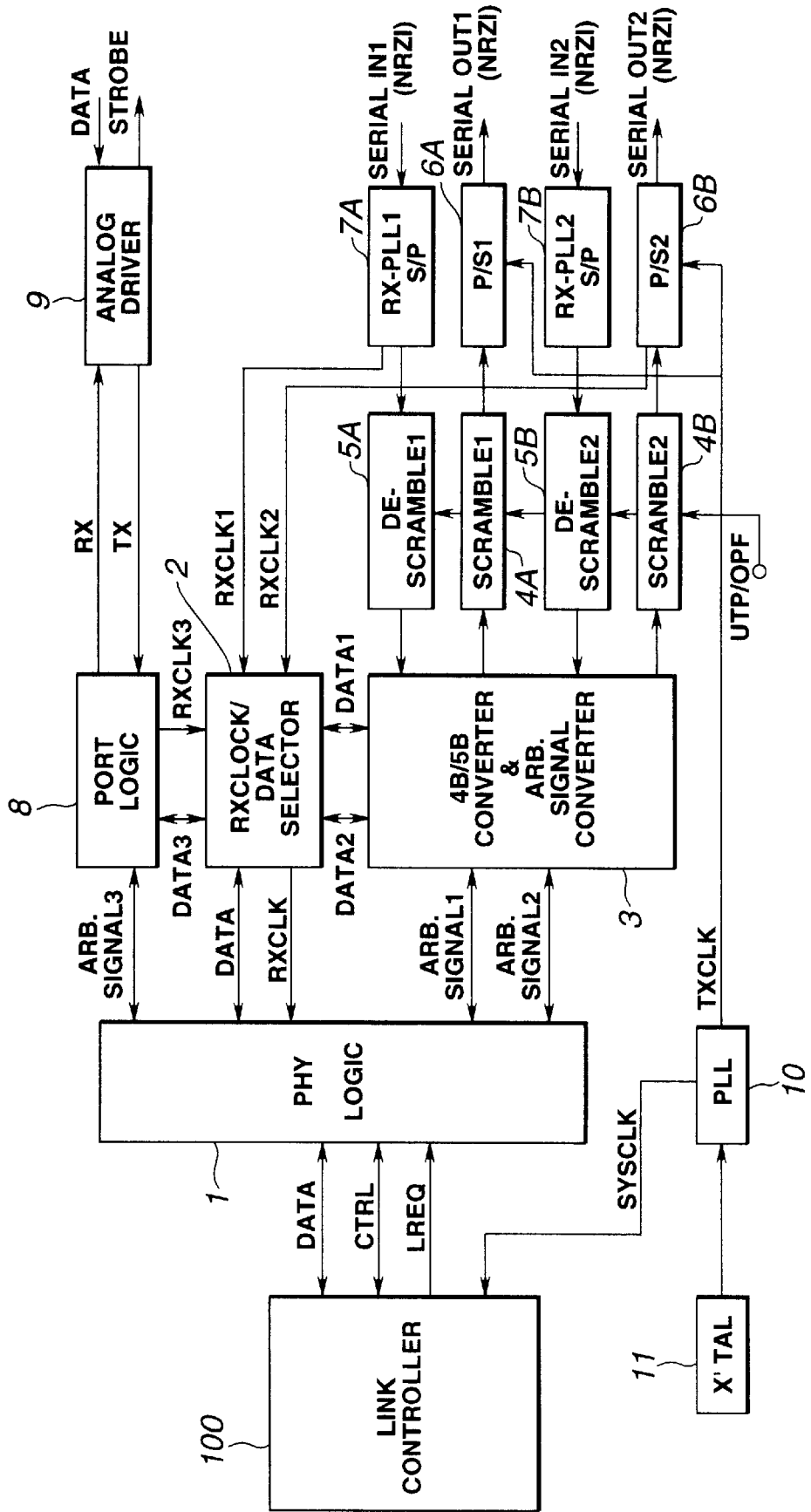
FIG. 9 is a block diagram showing the structure of an interface device for interfacing digital serial data used in an embodiment of the present invention.

The present invention is realized by using an interfacing device for digital serial data configured as shown for example, in FIG. 9.

The interfacing device, shown in FIG. 9, is made up of a physical layer logical block (PHY LOGIC) 1, a selector block (RXCLOCK/DATA SELECTOR) 2, a converting processing block (4B/5B CONVERTER & ARB. SIGNAL CONVERTER) 3, scrambling blocks (SCRAMBLE 1, SCRAMBLE 2) 4A, 4B, descrambling blocks (DE-SCRAMBLE 1, DE-SCRAMBLE 2) 5A, 5B, transmission blocks (P/S1, P/S2) 6A, 6B, receiving blocks (RX-PLL1 P/S, RX-PLL2 P/S) 7A, 7B, a port logical block 8 (PORT LOGIC), an analog driver (ANALOG DRIVER) 9 and a clock generating block (PLL) 10.

The physical layer logical block 1 performs I/O control and arbitration control with a link layer provided in the IEEE 1394 high-performance serial bus standard, referred to hereinafter as IEEE 1394 standard, and is connected to both a link layer controller 100 conforming to the IEEE 1394 standard and to the above-mentioned selector block 2, converting processing block 3 and the port logical block 8.

The I/O with the link layer in the physical layer logical block 1 is equivalent to the IEEE 1394 standard, that is, the communication between the link layer and the physical layer is by sending/receiving of data signals (DATA) and control signals (CTRL). In addition, a link request signal (LREQ) is sent from the link layer to the physical layer logical block 1 as a sending request from the link layer to the physical layer.

This physical layer logical block 1 has an arbitration controller, enclosed therein, and controls the transmission/reception between the arbitration process and the bus by the arbitration controller. If there is made a packet transmission request from the link layer, the physical layer logical block 1 starts arbitration after a suitable gap time. The gap time is varied with the type of arbitration. The physical layer logical block 1 also sends packet data (DATA) from the link layer to the selector block 2, while sending the arbitration request from the link layer to the converting processing block 3 and to the port logical block 8.

The selector block 2 selects sets of data (DATA 1, DATA 2) received via the converting processing block 3 and reception clocks (RXCLK 1, RXCLK2) and a set of data (DATA 3) received via port logical block 8 and reception clocks (RXCLK 3) and is connected to the physical layer logical block 1, converting processing block 3, reception blocks 7A, 7B and to the port logical block 8.

For sending data, this selector block 2 sends packet data (DATA) sent from the physical layer logical block 1 to the converting processing block 3 and to the port logical block 8. This sends transmission data to all transmission ports. For reception, the selector block 2 selects a set of packet data (DATA 1, DATA 2, DATA 3) received via converting processing block 3 and the port logical block 8 and reception clocks (RXCLK1, RXCLK2, RXCLK3) and sends the selected set, such as packet data (DATA 1) and the reception clocks (RXCLK 1), to the physical layer logical block 1. The packet data selected by the selector block 2, such as packet data (DATA 1) received by the converting processing block 3, are written by the reception clocks (RXCLK 1) in the FIFO memory in the physical layer logical block 1. The packet data written in the FIFO memory are read out by the system clocks SYSCLK supplied by the clock generating block 10.

The converting processing block 3 operates as 4 data bit/5 data bit converting means and as an arbitration signal conversion processing means for allocating 5-bit symbols other than the 5-bit symbols allocated to data by the 4 data bit/5 data bit converting processing to arbitration signals. During arbitration, the converting processing block 3 converts the arbitration signals (ARB.SIGNAL 1, ARB.SIGNAL 2) sent from the physical layer logical block 1 to one or two 5-bit symbols allocated as shown in Table 6, and sends the converted symbols to the scrambling blocks 4A, 4B. That is, for sending, the converting processing block 3 allocates each one symbol to each arbitration excluding TX_DATA_PREFIX and BUS_RESET, while allocating two symbols (11000 10001) to TX_DATA_PREFIX and two symbols (00000 11111) to BUS_RESET to send the resulting data, as shown in Table 6. Meanwhile, the Table 6 of the present embodiment is equivalent to Table 4 in IEEE 1394 standard.

Simultaneously, the converting processing block 3 converts the 5-bit arbitration symbol sent from the descrambling blocks 5A, 5B into signals corresponding to the states of arbitration, based on Table 7, and sends the resulting signals to the physical layer logical block 1. This conversion is done on the basis of the 5-bit received symbols and 5-bit sent symbols from the port. Among the arbitrations provided in IEEE 1394 standard, there are those which depend on the transmission state of the arbitration signals of the child and the parent, as shown in Table 5. If, for example, the parent node and the child node issue TX_PARENT_NOTIFY simultaneously to each other, ABR_A_TX=0 and ABR_B_TX=Z in the IEEE 1394 standard based on Table 4, such that, in the respective nodes, ABR_A=0 and ABR_B=0, as shown in Table 3. That is, the signals sent from the respective nodes cancel each other. In the present embodiment, since digital serial signals are sent to the twisted pair line, this cancelling is not performed. Therefore, the transmission symbol is stored in the memory or register in the converting processing block 3 and the arbitration state is set on the basis of the stored transmission symbols and reception symbols sent from the descrambling blocks 5A, 5B, with the corresponding arbitration signals being sent to the physical layer logical block 1. For the arbitration signals sent to the physical layer logical block 1, 2-bit signals are allocated to denote "0", "1" and "Z" in accordance with the IEEE 1394 standard. The associated arbitration states are found from the transmission and receiving symbols and arbitration signals are generated on the basis of Table 8 and sent to the physical layer logical block 1.

Meanwhile, the arbitration state may also be set based on the states of the node and the received symbols by managing the node states based on the symbols sent to a state machine, not shown. In the present embodiment, the table 7 corresponds to Table 5 of the IEEE 1394 standard.

TABLE 6

Transmission Symbol allocated for Arbitration

| transmission symbol | states of arbitration |
| --- | --- |
| 11111 | IDLE |
| 00100 | TX_REQUEST |
|  | TX_GRANT |
| 00101 | TX_PARENT_NOTIFY |
| 11000 10001 | TX_DATA_PREFIX |
| 00111 | TX_CHILD_NOTIFY |
|  | TX_IDENT_DONE |
| 01101 | TX_DATA_END |
| 00000 11111 | BUS_RESET |

TABLE 7

Arbitration Symbols Allocated for Arbitration

| reception symbols | transmission symbols | states of arbitration |
| --- | --- | --- |
| 11111 | 11111 | IDLE |
| 00101 | 11111 | RX-PARENT_NOTIFY |
| 11111 | 00100 | RX_REQUEST_CANCEL |
| 00111 | 11111 | RX_IDENT_DONE |
| 00100 | 11111 | RX_SELF_ID_GRANT |
| 00100 | 11111 | RX_REQUEST |
| 00101 | 00101 | RX_ROOT_CONTENTION |
| 00100 | 00100 | RX_GRANT |
| 00111 | 00101 | RX_PARENT_HANDSHAKE |
| 01101 | 11111 | RX_DATA_END |
| 11111 | 00111 | RX_CHILD_HANDSHAKE |
| 11000 10001 | 00100 | RX_DATA_PREFIX |
| 11000 10001 | 00111 | RX_DATA_PREFIX |
| 11000 10001 | 11111 | RX_DATA_PREFIX |
| 00000 11111 | (don't care) | BUS_RESET |

TABLE 8

Line States of Arbitration Signals Received by Physical Layer

|  | arbitration signals | |
| --- | --- | --- |
| states of arbitration | ARB_A | ARB_B |
| IDLE | Z | Z |
| RX_PARENT_NOTIFY | Z | 0 |
| RX_REQUEST_CANCEL | | |
| RX_IDENT_DONE | Z | 1 |

TABLE 8-continued

Line States of Arbitration Signals Received by Physical Layer

|  | arbitration signals | |
| --- | --- | --- |
| states of arbitration | ARB_A | ARB_B |
| RX_SELF_ID_GRANT | 0 | Z |
| RX_REQUEST | | |
| RX_ROOT_CONTENTION | 0 | 0 |
| RX_GRANT | | |
| RX_PARENT_HANDSHAKE | 0 | 1 |
| RX_DATA_END | | |
| RX_CHILD_HANDSHAKE | 1 | Z |
| RX_DATA_PREFIX | 1 | 0 |
| BUS_RESET | 1 | 1 |

During transmission of the packet data, the converting processing block 3 converts packet data (DATA 1, DATA 2) sent via selector block 2 from 4-bit signals into 5-bit signals, allocated as shown in Table 9, to send the converted signals to the scrambling blocks 4A, 4B. Simultaneously, the converting processing block 3 converts the 5-bit reception packet data, sent from the descrambling blocks 5A, 5B, from the 5-bits signals to the 4-bit signals, which are sent to the selector block 2.

TABLE 9

Symbols Allocated to Data

| hexadecimal | binary | symbols |
| --- | --- | --- |
| 0 | 0000 | 11110 |
| 1 | 0001 | 01001 |
| 2 | 0010 | 10100 |
| 3 | 0011 | 10101 |
| 4 | 0100 | 01010 |
| 5 | 0101 | 01011 |
| 6 | 0110 | 01110 |
| 7 | 0111 | 01111 |
| 8 | 1000 | 10010 |
| 9 | 1001 | 10011 |
| A | 1010 | 10110 |
| B | 1011 | 10111 |
| C | 1100 | 11010 |
| D | 1101 | 11011 |
| E | 1110 | 11100 |
| F | 1111 | 11101 |

In the 4 bit/5 bit conversion in the above converting processing block 3, 5-bit symbols, containing a larger quantity of clock components, are allocated to packet data (DATA 1, DATA 2), as shown in table 9. By this, the receiving side of the packet data (DATA 1, DATA 2) can positively generate reception clocks (RXCLK1, RXCLK2) from the reception signals by PLL.

By allocating a 5-bit symbol containing most abundantly the IDLE (11111), that is the clock information, to the idle state in the arbitration of the IEEE 1394 standard, the PLL lock state on the reception side can be maintained even in the idle state in the arbitration, thus enabling the arbitration to be executed reliably.

In this interfacing device, in which, in each of transmission blocks 6A, 6B, as later explained, the 5-bit sending signals are converted from 5-bit transmission signals to serial data and NRZ (non-return-to-zero) data to NRZI (non-return-to-zero inverse) data, and changes caused to data are sent as three-level signals, the sent signal having the maximum frequency is 11111 . . . and corresponds to the 5-bit symbol of IDLE (11111) allocated to the idle states in the arbitration of the IEEE 1394 standard, so that the signal occupies the major portion of the transmission time. If the transmission rate is 100 Mbps, unneeded radiations having peaks at the frequency of 31.25 MHz are produced when sending 125 Mbps signals by 4B/5B conversion. For diminishing the peaks, it suffices if preset patterns are not repeated in succession. Therefore, the scrambling blocks 4A, 4B are provided to diminish these unneeded radiations.

The scrambling blocks 4A, 4B scramble the 5-bit transmission signals sent from the converting processing block 3 during transmission of packet data to diminish the unneeded radiations of the 5-bit transmission signals. The transmission blocks 6A, 6B are fed with scambled 5-bit transmission signals from the scrambling blocks 4A, 4B.

Moreover, since symbols other than idle (11111), TX_DATA_PREFIX (11000 10001) and TX_DATA_END (01101) are all headed by 2-bit "0"s, each arbitration signal with five bits including these "0"s can be determined as being a symbol on the assumption that if, at the time of symbol synchronization after serial/parallel conversion, 2-bit "0"s are found, these denote the leading end of a symbol. However, as to BUS_RESET (00000 11111), each arbitration signal can be determined on reception of five consecutive "0"s without taking account of the 2-bit "0"s.

The reason two symbols (00000 11111) are allocated to BUS_RESET is to lock the PLL and to maintain the locked state. If only one symbol (00000) is allocated to BUS_RESET, it becomes impossible to lock the PLL and to maintain the locked state on reception of BUS_RESET. In allocating 5-bit symbols to data and the arbitration states, such a code is selected which allows for PLL lock on conversion to NRZI code without producing partiality in the DC balance. Since there is a certain limit to the number of the 5-bit symbols satisfying these conditions, such a code which satisfies these conditions can be obtained by combining two symbols.

As for TX_DATA_PREFIX (11000 10001), it is detected independently of other arbitration signals. That is, reception data are shifted one bit to prepare five data strings, each with a length of 10 bits. If the data strings coincide with the bit pattern of TX_DATA_PREFIX (11000 10001), reception of TX_DATA_PREFIX is determined. Since the packet data are received in succession directly after reception of TX_DATA_PREFIX, symbol synchronization of the packet data can be applied by reception of TX_DATA_PREFIX.

Since TX_DATA_END (01101) is received in succession directly after the packet data, it can be detected by the same symbol synchronization as that of the TX_DATA_PREFIX and packet data. Meanwhile, since the bit pattern (11000 10001) of TX_DATA_PREFIX is not present in the data string of the packet data converted by Table 9, it is not detected in the packet data even if symbol synchronization is not applied, so that there occurs no reception of mistaken data. After detection of TX_DATA_PREFIX, arbitration signals other than TX_DATA_END or BUS_RESET are not detected.

The descrambling blocks 5A, 5B performs descrambling associated with the scrambling by the scrambling blocks 4A, 4B on the 5-bit reception signals sent from the reception blocks 7A, 7B to descramble the 5-bit reception signals. The converting processing block 3 is fed from the descrambling blocks 5A, 5B with descrambled 5-bit reception signals.

The on/off states of respective operations of the scrambling blocks 4A, 4B and the descrambling blocks 5A, 5B can be set on switching.

The transmission blocks 6A, 6B convert the scrambled 5-bit transmission signals, scrambled by the scrambling blocks 4A, 4B, from parallel data to serial data and from NRZ (non-return-to-zero) data to NRZI (non-return-to-zero inverse) to send changes caused in the data as three-valued signals.

The reception blocks 7A, 7B also convert the reception signals from the NRZI (non-return-to-zero inverse) to NRZ (non-return-to-zero) data and from the serial data to the parallel data to send the 5-bit reception signals to the descrambling blocks 5A, 5B. The reception blocks 7A, 7B generate reception clocks (RXCLK 1, RXCLK2) from the received data by PLL to send the generated clocks to the selector block 2.

The port logical block 8 is adapted to send/receive data (DATA 3) and arbitration signals (ARB.SIGNAL 3) conforming to the physical layer of the IEEE 1394 standard and generates reception clocks (RXCLK 3) from data sent via analog driver 9 and its strobe signals. During arbitration, the port logical block 8 is fed with the arbitration signal (ARB.SIGNAL 3) from the physical layer logical block 1.

During data transmission, the port logical block 8 converts the packet data (DATA 3) sent from the physical layer logical block 1 via selector block 2 by transmission clocks (TXCLK) sent from a clock generating block 10 into serial data which is sent via analog driver 9.

During data reception, the port logical block 8 sends the packet data (DATA 3) received via analog driver 9 along with the reception clocks (RXCLK 3) via selector block 3 to the physical layer logical block 1. If this port logical block 8 is selected by the selector block 3, the packet data (DATA 3) is written by its reception clocks (RXCLK 3) in the FIFO memory in the physical layer logical block 1.

The clock generating block 10 is adapted to generate 49.152 MHz system clocks (SYSCLK) and 98.304 MHz transmission clocks (TXCLK) from the 24.576 MHz clocks accorded by a quartz oscillator 11.

The above-described interfacing device for serial data includes the converting processing block 3 for performing 4 bit/5 bit conversion on the arbitration signals (ARB.SIGNAL 1, ARB.SIGNAL 2) and on the packet data (DATA 1, DATA 2) to send or receive the arbitration signals (ARB.SIGNAL 1, ARB.SIGNAL 2) and the packet data (DATA 1, DATA 2) as 5-bit code data via transmission blocks 6A, 6B and reception blocks 7A, 7B to effectuate long-distance transmission using an optical fiber cable or an inexpensive UTP (unshielded twisted pair) cable as a transmission cable. This interfacing device also includes the port logical block 8 and the analog driver 9 conforming to the physical layer of the IEEE 1394 standard to render possible co-existence of the transmission path by the cable conforming to the IEEE 1394 standard with the optical cable or the transmission path by the UTP cable.

The above-mentioned scrambling blocks 4A, 4B and descrambling blocks 5A, 5B are hereinafter explained.

Figure 10:
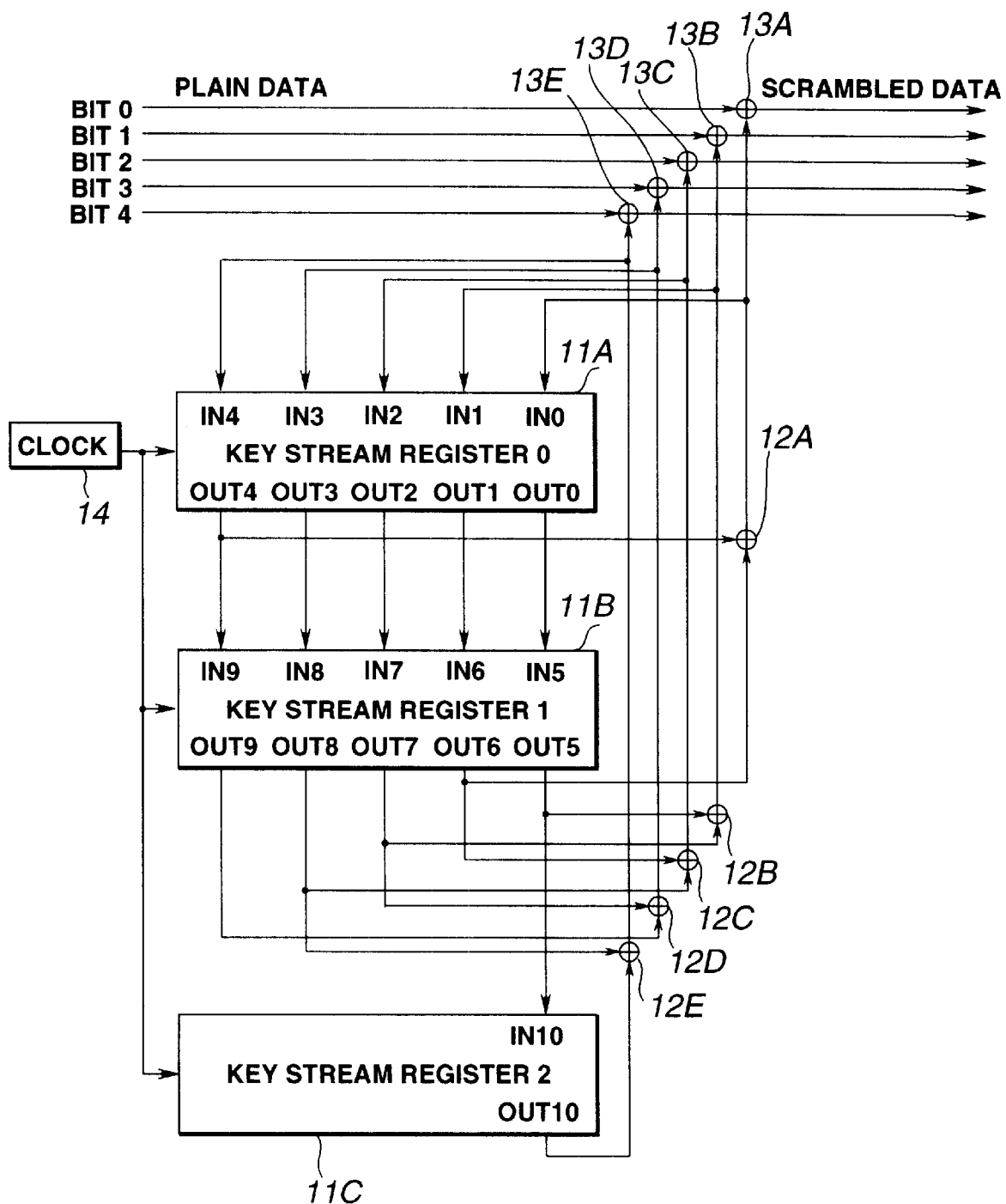
FIG. 10 is a block diagram showing a specified structure of a scramble block in an interfacing device for the above digital serial data.

The above two scrambling blocks 4A, 4B are of the same structure and each include keystream registers 11A, 11B, 11C, exclusive OR gates 12A, 12B, 12C, 12D and 12E, exclusive OR gates 13A, 13B, 13C, 13D and 13E and a transmission clock generator 14, as shown for example, in FIG. 10. If there is no necessity for making distinction, the keystream registers 11A, 11B, 11C, exclusive OR gates 12A, 12B, 12C, 12D and 12E and exclusive OR gates 13A, 13B, 13C, 13D and 13E are referred to hereinafter as a keystream register 11, an exclusive OR circuit 12 and an exclusive OR circuit 13, respectively.

In an illustrative structure of the scramble block, shown in FIG. 10, transmission clocks (CLOCK) are sent to the keystream register 11 from the transmission clock generator 14. The keystream register 11 is a 11-bit register and has its initial value set to a suitable value other than 0, such as [11111111111]. In the keystream register 11, output signals of output ports OUT0 to OUT4 of the keystream register 11A are sent to input ports IN5 to IN9 of the keystream register 11B, every transmission clock (CLOCK), such that output signals of the output port OUT5 of the keystream register 11B are sent to the input port IN10 of the keystrearn register 11C.

On the other hand, the output signal of the output port OUT4 of the keystream register 11A and the output signal of the output port OUT6 of the keystream register 11B are sent to the exclusive OR circuit 12A, an output signal of which is sent to the input port IN0 of the keystream register 11A and to the exclusive OR circuit 13A. Output signals of the output ports OUT5 and OUT7 of the keystream register 11B are entered to the exclusive OR circuit 12B, an output signal of which is sent to an input port IN1 of the keystream register 11A and to the exclusive OR circuit 13B. Output signals of the output ports OUT6 and OUT8 of the keystream register 11B are entered to the exclusive OR circuit 12C, an output signal of which is sent to the input port IN2 of the keystream register 11A and to the exclusive OR circuit 13C. On the other hand, output signals of the output ports OUT7 and OUT9 of the keystream register 11B are entered to the exclusive OR circuit 12D, an output signal of which is sent to the input port IN3 of the keystream register 11A and to the exclusive OR circuit 13D. An output signal of the output port OUT8 of the keystream register 11B and an output signal of the output port OUT10 of the keystream register 11C are sent to the exclusive OR circuit 12E, an output signal of which is sent to the input port IN4 of the keystream register 11A and to the exclusive OR circuit 13E.

If the initial value of the contents of the keystream register 11 is "ABCDEFGHIJK", where A to K denote 1 or 0, with A being an output of the keystream register 11C, BCDEF being an output of the keystream register 11B and GHIJK being an output of the keystream register 11A, the contents of the keystream register 11 are moved every transmission clock (CLOCK), as shown in Table 10, where ⌒ denotes an exclusive OR output.

data registers 21A, 21B, 21C, hypothesis registers 22A, 22B, 22C, a comparate pattern register 23, a hypothesis data comparator 24, keystream registers 25A, 25B, 25C, a detection pattern register 26, a detection pattern register 26, a 2-bit counter 27, keystream selectors 28A, 28B, 28C, a reception clock generator 29, exclusive OR circuits 30A, 30B, 30D, 30E, exclusive OR circuits 30A, 30B, 30C, 30D, 30E, exclusive OR circuits 31A, 31B, 31C, 31D, 31E, exclusive OR circuits 32A, 32B, 32C, 32D, 32E, exclusive OR circuits 33A, 33B, 33C, 33D, 33E and an exclusive OR circuit 34. If distinction is not required, the scrambled data registers 21A, 21B, 21C, hypothesis registers 22A, 22B, 22C, keystream registers 25A, 25B, 25C, keystream selectors 28A, 28B, 28C, exclusive OR circuits 30A, 30B, 30C, 30D, 30E, exclusive OR circuits 31A, 31B, 31C, 31D, 31E, exclusive OR circuits 32A, 32B, 32C, 32D, 32E and the exclusive OR circuits 33A, 33B, 33C, 33D, 33E are referred to hereinafter as a scrambled data register 21, hypothesis register 22, a keystream register 25, a keystream selector 28, an exclusive OR circuit 30, an exclusive OR circuit 31, an exclusive OR circuit 32, and an exclusive OR circuit 33, respectively.

Figure 11:
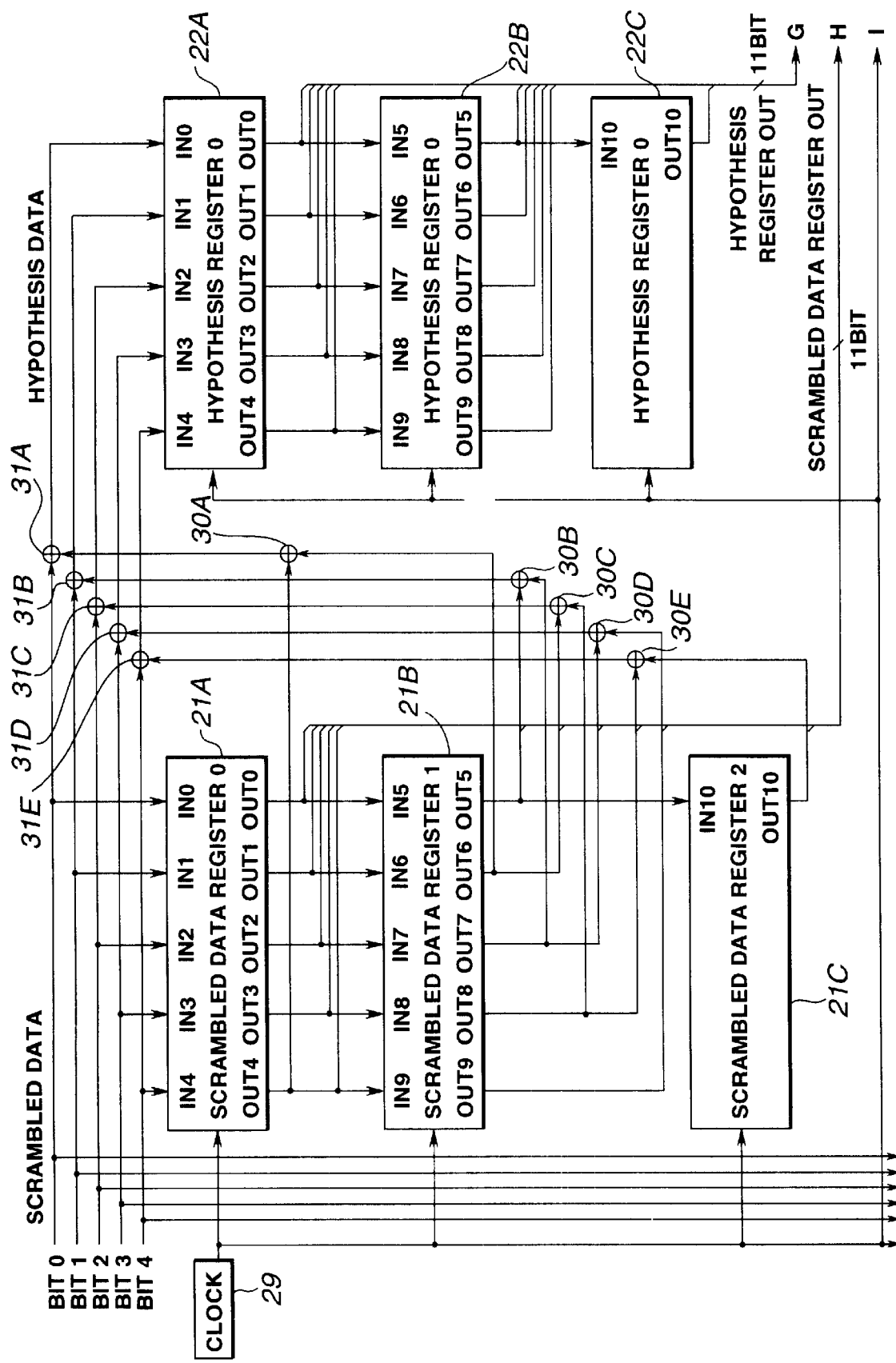
FIG. 11 is a block diagram showing a portion of a specified structure of a descrambling block in the above interfacing device for the digital serial data.
Figure 12:
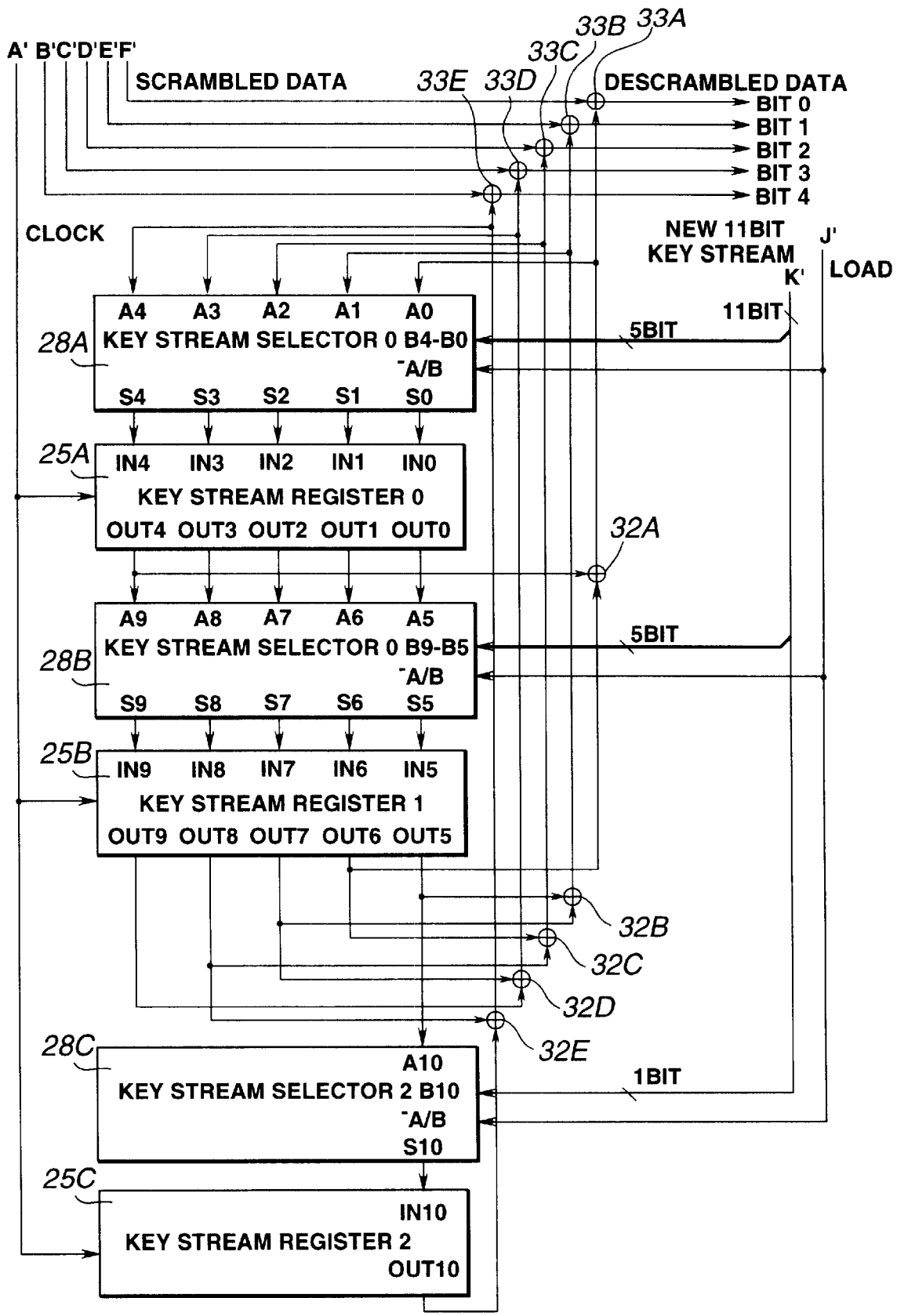
FIG. 12 is a block diagram showing a part of the specified structure of the descrambling block.
Figure 13:
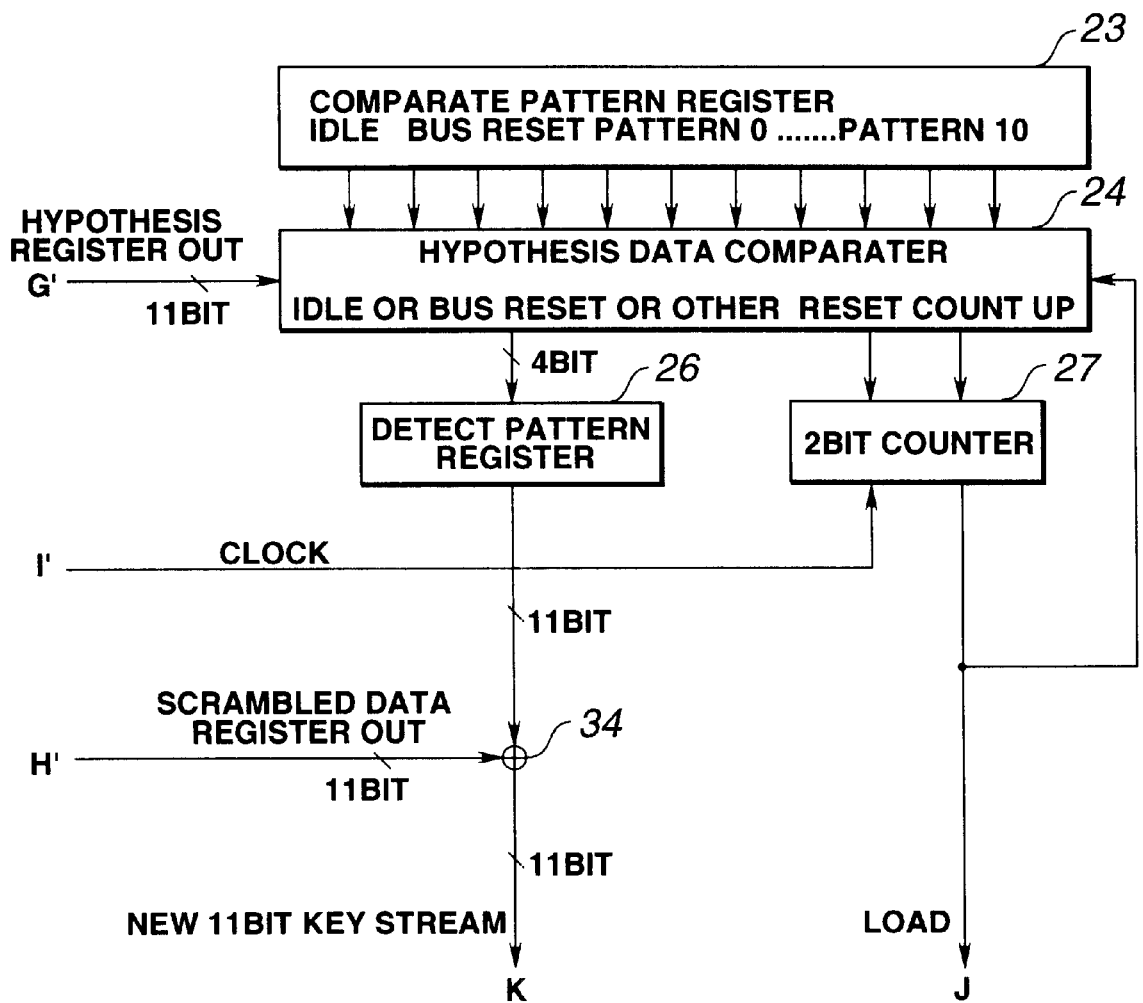
FIG. 13 is a block diagram showing a part of the specified structure of the descrambling block.
Figure 14:
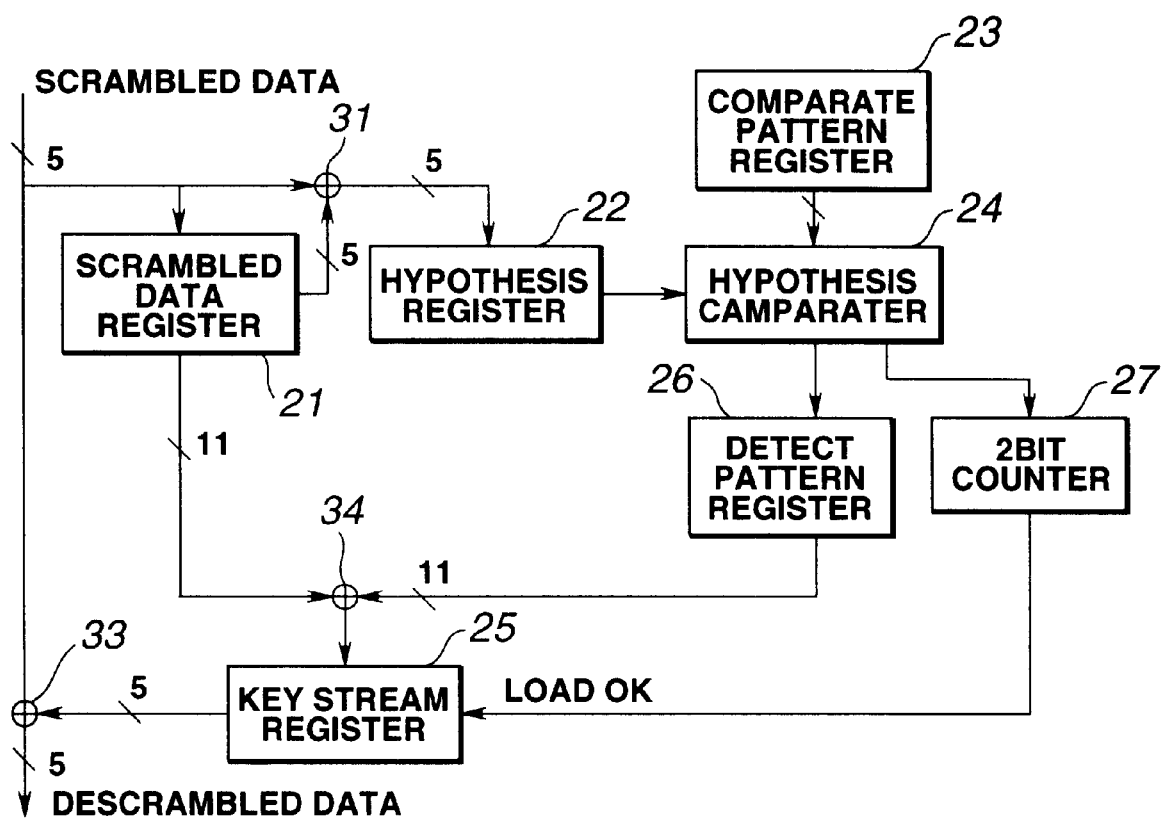
FIG. 14 is a block diagram showing the specified structure of the descrambling block in its entirety.

Although split for the sake of illustration, FIGS. 11 to 13 actually connect to one another. In FIG. 11, A, B, C, D, E and F are connected to A', B', C', D', E' and F' in FIG. 12, respectively. Similarly, G, H and I in FIG. 11 connect to G', H' and I' in FIG. 13, respectively, while J and K in FIG. 13 connect to J' and K' in FIG. 11, respectively. FIG. 14 shows a schematic structure in its entirety.

In this illustrative example of this descrambling block, received 5-bit scrambled data are sent to the exclusive OR circuit 31 shown in FIG. 11, to the exclusive OR circuit 33 shown in FIG. 12 and to input ports IN0 to IN4 of the scrambled data register 21A.

To the scrambled data register 21, hypothesis register 22 and to a 2-bit counter 27 are sent reception clock (CLOCK) from a transmission clock generator 29, as shown in FIG. 11. The received 5-bit scrambled data is stored in the scrambled data register 21A.

Output signals of the output ports OUT0 to OUT4 of the scrambled data register 21A of the scrambled data register 21 are sent to input ports IN5 to IN9 of the scrambled data register 21B, for each reception clock (CLOCK) accorded from the scrambled data register 21A, while output signals

TABLE 10

| time | 11 BIT | 10 BIT | 9 BIT | 8 BIT | 7 BIT | 6 BIT | 5 BIT | 4 BIT | 3 BIT | 2 BIT | 1 BIT |
|---|---|---|---|---|---|---|---|---|---|---|---|
| — | A | B | C | D | E | F | G | H | I | J | K |
| t | F | G | H | I | J | K | A-C | B-D | C-E | D-F | E-G |
| t + 1 | K | A-C | B-D | C-E | D-F | E-G | F-H | G-I | H-J | I-K | J-A-C |
| t + 2 | E-G | F-H | G-I | H-J | I-K | J-A-C | K-B-D | A-E- | B-F | C-G- | D-H |
| t + 3 | J-A-C | K-B-D | A-E- | B-F | C-G- | D-H- | E-I- | F-J- | G-K | H-A-C | I-B-D |
| ... | ... | ... | ... | ... | ... | ... | ... | ... | ... | ... | ... |

In this scramble block, 5-bit input signal PLAIN DATA (BIT 0, BIT 1, BIT2, BIT 3, BIT 4) as input signals are sent to the exclusive OR circuit 13 so as to be outputted via this exclusive OR circuit 13 as 5-bit output signal SCRAMBLED DATA. That is, the 5-bit output signal SCRAMBLED DATA is obtained as an exclusive OR output of the 5-bit input signal PLAIN DATA (BIT 0, BIT 1, BIT2, BIT 3, BIT 4) and an output signal of the exclusive OR circuit 12 sent to the input ports IN0 to IN4.

The two descrambling blocks 5A, 5B are of the same structure and include, as shown in FIGS. 11 to 14, scrambled of the output port OUT5 of the scrambled data register 21B are sent to the input port IN0 of the scrambled data register 21C of the scrambled data register 21.

The output signal of the output port OUT4 of the scrambled data register 21A and the output signal of the output port OUT6 of the scrambled data register 21B are sent to the exclusive OR circuit 30A, an output signal of which is sent to the exclusive OR circuit 31A. Output signals of the output ports OUT5 and OUT7 of the scrambled data register 21B are sent to the exclusive OR circuit 30B, an output signal of which is sent to the exclusive OR circuit 31B. Also, output signals of the output ports OUT6 and OUT8 of the scrambled data register 21B are sent to the exclusive OR circuit 30C, an output signal of which is sent to the exclusive OR circuit 31C. Likewise, output signals of the output ports OUT7 and OUT9 of the scrambled data register 21B are sent to the exclusive OR circuit 30D, an output signal of which is sent to the exclusive OR circuit 31D. In addition, an output signal of the output port OUT8 of the scrambled data register 21B and an output signal of the output port OUT10 of the scrambled data register 21C are sent to the exclusive OR circuit 30E, an output signal of which is entered to the exclusive OR circuit 31E. Output signals of the output ports OUT0 to OUT10 of the scrambled data register 21 are sent to a 11-bit exclusive OR circuit 34 shown in FIG. 13.

In this descrambling block, the received 5-bit scrambled data as input signals are sent to input ports IN0 to IN4 of the scrambled data register 21A and to the exclusive OR circuit 31, while being sent via the exclusive OR circuit 31 to the input ports IN0 to IN4 of the hypothesis register 22A. That is, a 5-bit hypothesis data (HYPOTHESIS DATA) corresponding to a logical sum of the received 5-bit scrambled data and an output signal of the exclusive OR circuit 30 fed with the output signals of the output ports OUT4 to OUT10 of the scrambled data register 21A is sent to the input ports IN0 to IN4 of the hypothesis register 22A.

The hypothesis register 22 is a 11-bit register configured so that output signals of the output ports OUT0 to OUT4 of the hypothesis register 22A are sent to the input ports IN5 to IN9 of the hypothesis register 22B, every reception clock (CLOCK) sent from the reception clock generator 29, and so that the output signal of the output port OUT5 of the hypothesis register 22B will be sent to the input port IN10 of the hypothesis register 22C. Output signals of the output ports OUT0 to OUT10 of the hypothesis register 22 are sent to the hypothesis data comparator 24 shown in FIG. 13.

If 5-bit hypothesis data (HYPOTHESIS DATA) at time t are H0(t), H1(t), H2(t), H(3)t and H4(t), 5-bit plain data PLAIN DATA are P0(t), P1(t), P2(t), P(3)t and P4(t), and the value of the keystream register 11 is [abcdefghijk], the following relation:

$H0(t+3)=I \frown B \frown P0(t+3) \frown K \frown B \frown D \frown P4(t+2) \frown I \frown K \frown P1(t+1)=P0(t+3) \frown P4(t+2) \frown P1(t+1)$ $H1(t+3)=H \frown A \frown C \frown P1(t+3) \frown J \frown A \frown C \frown P0(t+1) \frown H \frown J \frown P2(t+1)=P1(t+3) \frown P0(t+1) \frown P2(t+1)$ $H2(t+3)=G \frown K \frown P2(t+3) \frown I \frown K \frown P2(t+1) \frown G \frown I \frown P3(t+1)=P2(t+3) \frown P1(t+1) \frown P3(t+1)$ $H3(t+3)=F \frown J \frown P3(t+3) \frown H \frown J \frown P2(t+1) \frown F \frown H \frown P4(t+1)=P3(t+3) \frown P2(t+1) \frown P4(t+1)$ $H4(t+3)=E \frown I \frown P4(t+3) \frown G \frown I \frown P3(t+1) \frown E \frown G \frown P0(t)=P4(t30\ 3) \frown P3(t+1) \frown P0(t)$ holds between the hypothesis data (HYPOTHESIS DATA) and the plain data (PLAIN DATA), where $\frown$ denotes exclusive OR.

That is, with the hypothesis data (HYPOTHESIS DATA), keystream components cancel one another at all times, without regard to the initial value of the transmission side keystream register 11 and time, as a result of the above calculations, so that an output is the results of calculations of the plain data (PLAIN DATA).

By the above relation, IDLE (11111) and BUS_RESET (00000 11111) can be detected in the hypothesis data comparator 24.

It is noted that IDLE (11111) can be detected when the output value of the hypothesis register 22 is "11111111111".

For detecting BUS_RESET, it is necessary to detect ten patterns, namely (00000 11110), (00001 11110), (00011 11100), (00111 11000), (01111 10000), (11111 00000), (1111000001), (1110000011), (1100000111)and (1000001111). At this time, output values of the hypothesis register 22 are [01000101110], [10001011101], [00010111010], [00101110100], [01011101000], [10111010001], [01110100010], [11101000101], [11010001011] and [10100010111]. The comparate pattern register 23 is a register for holding a comparate pattern [11111111111] used in the hypothesis data comparator 24b to detect IDLE(11111) and comparate patterns [01000101110], [10001011101], [00010111010], [00101110100], [01011101000], [10111010001], [01110100010], [11101000101], [11010001011] and [10100010111] used for detecting the BUS_RESET (00000 11111).

The hypothesis data comparator 24 compares output data of the hypothesis register 22 to 11 comparate patterns accorded by the comparate pattern register 23. If any comparate patterns coincide, the hypothesis data comparator 24 outputs a countup signal to the 2-bit counter 27, while outputting the information indicating which comparate pattern is in coincidence to the detection pattern register 26. When the load signal is entered, or if output data of the hypothesis register 22 is coincident with none of the 11 comparate patterns accorded by the comparate pattern register 23, the hypothesis data comparator 24 issues a reset signal to the 2-bit counter 27. The 2-bit counter 27 is incremented each time the countup signal is entered. If the count value is [3], the 2-bit counter 27 outputs a load signal to the hypothesis data comparator 24 and to the keystream selector 28. If fed with a reset signal, the 2-bit counter 27 resets the count value to [0]. Thus, synchronization is applied only if IDLE or BUS_RESET is detected three times on end. The result is the decreased possibility of the mistaken synchronization due to, for example, mistaken bit inversion due to noise.

Based on the information from the hypothesis data comparator 24 indicating which comparate pattern shows coincidence, the detection pattern register 26 outputs a detection pattern [11111111111] shown in Table 11 on IDLE detection, while outputting detection patterns [1000001111], [0000011111], [0000111110], [0001111100], [001111100], [011110000], [1111100000], [1111000001], [1110000011] and [1100000111], shown in Table 12, to the exclusive OR circuit 34, on detection of BUS_RESET.

TABLE 11

| value of comparate pattern | value of detection pattern |
|---|---|
| [11111111111] | [11111111111] |

TABLE 12

| value of comparate pattern | value of detection pattern |
|---|---|
| [01000101110] | [1000001111] |
| [10001011101] | [0000011111] |
| [00010111010] | [0000111110] |
| [00101110100] | [0001111100] |
| [01011101000] | [0011111000] |
| [10111010001] | [0111110000] |
| [01110100010] | [1111100000] |
| [11101000101] | [1111000001] |

TABLE 12-continued

| value of comparate pattern | value of detection pattern |
|---|---|
| [11010001011] | [1110000011] |
| [10100010111] | [1100000111] |

The exclusive OR circuit 34 takes an exclusive OR of output data of the scrambled data register 21 and detection patterns supplied from the detection pattern register 26 to send the exclusive OR output as a new 11-bit key stream to input ports B0 to B10 of the keystream selector 28 shown in FIG. 12.

The keystream selector 28A is fed at input ports A0 to A4 with output signals of the exclusive OR circuit 32 and outputs input signals of the input ports B0 to B4, that is 5 bits of a new 11-bit key stream, at output port S0 to S4, if the load signal is sent thereto from the 2-bit counter 27 shown in FIG. 13. If not fed with the load signals, the keystream selector 28A outputs input signals from the input ports A0 and A1 at output port S0 to S4. Output signals of output port S0 to S4 of the keystream selector 28A are entered to the input ports IN0 to IN4 of the keystream register 25A. The keystream register 25A is designed so that output signals of the output ports OUT0 to OUT4 will be sent to the input ports A5 to A9 of the keystream selector 28B for each reception clock (CLOCK) accorded by the reception clock generator 29. An output signal of the output port OUT4 of the keystream register 25A and an output signal of the output port OUT6 of the keystream register 25B are entered to the exclusive OR circuit 32A, output signals of which are sent to the input pot A0 of the keystream selector 28A and to the exclusive OR circuit 33A.

If fed with a load signal from the 2-bit counter 27, the keystream selector 28B outputs input signals of the input ports B5 to B9, that is 5 bits of the new 11-bit key stream, at output ports S5 to S9. If not fed with the load signal, the keystream selector 28B outputs the input signals from the input ports A5 to A9 at the output ports S5 to S9. Output signals of the output ports S5 to S9 of the keystream selector 28B are sent to the input ports IN5 to IN9 of the keystream register 25B, which outputs output signals at the output ports OUT5 to OUT9 every reception clock (CLOCK). An output signal of the output port OUT5 of the keystream register 25B is sent to the input port IN10 of the keystream selector 28C. Output signals of the output ports OUT5 and OUT7 of the keystream register 25B are sent to the exclusive OR circuit 32B, an output signal of which is sent to the input port IN1 of the keystream selector 28A and to the exclusive OR circuit 33B. Output signals of the output ports OUT6 and OUT8 of the keystream register 25B are entered to the exclusive OR circuit 32C, an output signal of which is entered to the input port IN2 of the keystream selector 28A and to the exclusive OR circuit 33D. Output signals of the output ports OUT5 and OUT7 of the keystream register 25B are sent to the exclusive OR circuit 32D, an output signal of which is sent to the input port IN3 of the keystream selector 28A and to the exclusive OR circuit 33D. An output signal of the output port OUT8 of the keystream register 25B and an output signal of the output port OUT10 of the keystream register 25C are entered to the exclusive OR circuit 32E, an output signal of which is entered to the input port IN4 of the keystream selector 28A and to the exclusive OR circuit 33E.

When fed with the load signal from the 2-bit counter 27, the keystream selector 28C outputs an input signal of the input port B10, that is a bit of the new 11-bit key stream, to the output port S10. When not fed with the load signal, the keystream selector 28C outputs an input signal from the input port A10 to the output port S10. An output signal of the output port S10 of the keystream selector 28B is entered to the input port IN10 of the keystream register 25C, which issues an output signal of the output port OUT10 to the exclusive OR circuit 32E every reception clock (CLOCK).

In the above-described descrambling block, a load signal is entered from the 2-bit counter 27 to the keystream selector 28, and a new 11 bit keystream from the exclusive OR circuit 34 is loaded via the keystream selector 28 to the keystream register 25 to achieve synchronization with the transmission side scramble block to enable a regular descrambling operation. An output signal DESCRAMBLED DATA equivalent to the input signal PLAIN DATA on the scrambling block on the transmission side can be obtained as an exclusive OR output by the exclusive OR circuit 33.

Thus, it is possible with the interfacing device shown in FIG. 9 to prevent unneeded radiations by the scrambling blocks 4A, 4B and the descramble blocks 5A, 5B to effect long-distance transmission of serial data by the UTP cable.

It is noted that, in the descrambling block shown in FIG. 14, detection of IDLE (11111) occurs if the output value of the hypothesis register 22 is [11111111111]. On the other hand, in detecting BUS_RESET, ten patterns of (00000 11111), (00001 11110), (00011 11100), (00111 11000), (01111 10000), (11111 00000), (11110 00001), (11100 00011), (11000 00111) and (10000 01111), at which time output values of the hypothesis register 22 are [01000101110], [10001011101], [00010111010], [00101110100], [01011101000], [10111010001], [01110100010], [11101000101], [11010001011], [10100010111]. However, if the data is of a specified pattern, the associated hypothesis data (HYPOTHESIS DATA) is uniquely determined without regard to the scramble component. On the contrary, the hypothesis data (HYPOTHESIS DATA) is not uniquely determined for a specified case of the hypothesis data (HYPOTHESIS DATA).

Figure 15:
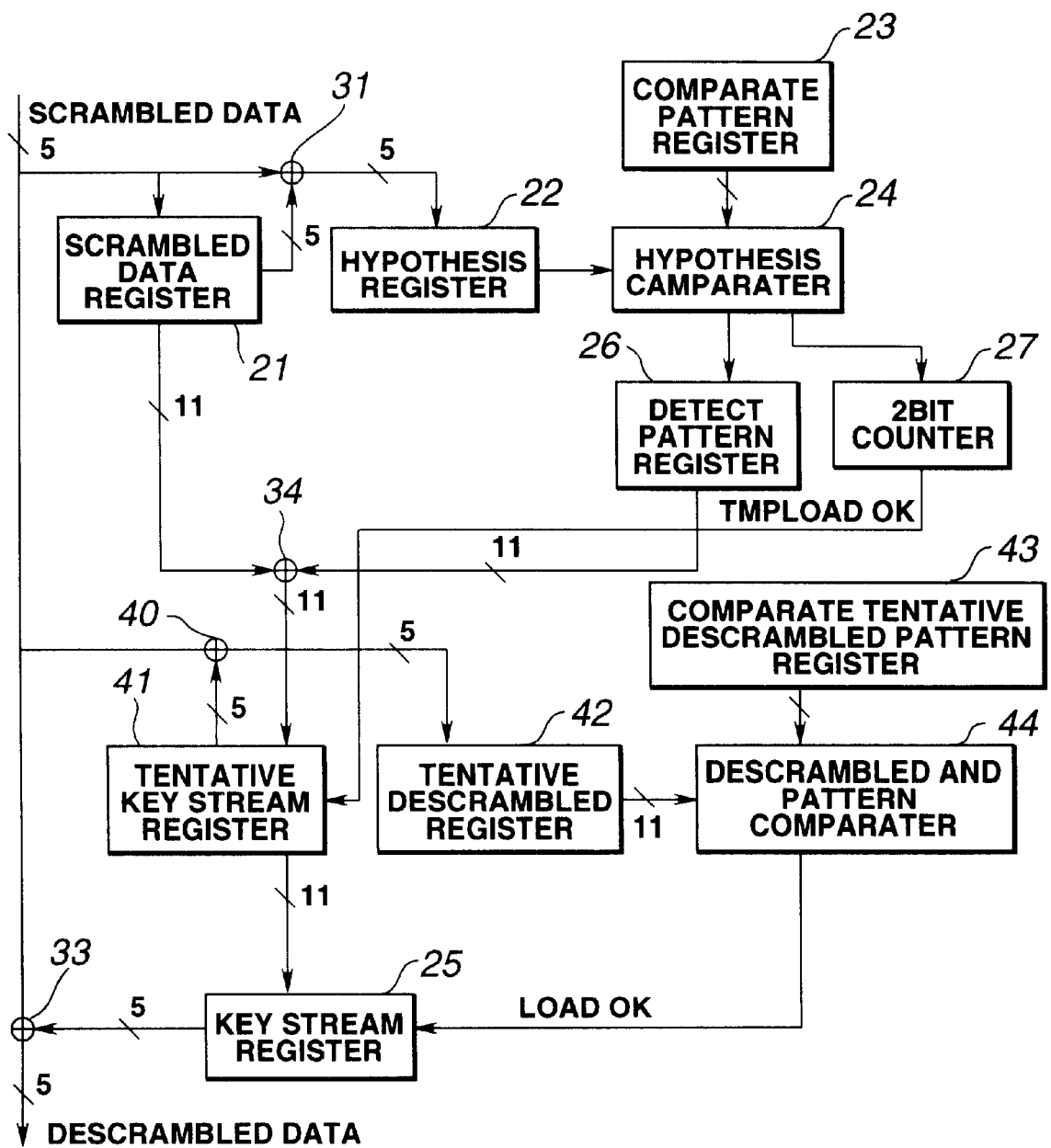
FIG. 15 is a block diagram showing another specified structure of the descrambling block in its entirety.

By designing the descrambling blocks 5A, 5B as shown in FIG. 15, descrambling can be done with high accuracy. In the descrambling block, shown in FIG. 15, the component parts which are the same as those shown in FIG. 14 are denoted by the same reference numerals and are not explained specifically.

That is, the present descrambling block effectuates pattern detection a second time on a 11-bit key stream obtained as an exclusive OR output of the exclusive OR circuit 34 which takes an exclusive OR of output data of the scrambled data register 21 in the descrambling block shown in FIG. 14 and a detection pattern supplied from the detection pattern register 26 to elevate the key stream detection accuracy, and additionally includes an exclusive OR circuit 40, a tentative key stream register 41, a tentative descrambled register 42, a comparate tentative descrambled pattern register 43 and a descrambled pattern comparator 44.

In this descrambling block, the tentative key stream register 41 is loaded with the 11 bit key stream, obtained as an exclusive OR output of the exclusive OR circuit 34, in synchronism with an output of the 2-bit counter 27. The exclusive OR circuit 40 takes an exclusive OR of the received 5-bit scrambled data and the contents of the tentative key stream register 41 to issue an output of the exclusive OR calculations to the tentative descrambled register 42.

That is, this descrambling block sends the 11-bit key stream, obtained as the exclusive OR output of the exclusive OR circuit 34, to the tentative key stream register 41 to take the exclusive OR with the contents of the tentative key stream register 41 in the exclusive OR circuit 40 to descramble the received scrambled 5-bit data.

If an output value of the hypothesis register 22 is [1111111111], the data is likely to be IDLE (11111). Also, if the output value of the hypothesis register 22 is [01000101110], [10001011101], [00010111010], [00101110100], [01011101000], [10111010001], [01110100010], [11101000101], [11010001011] or [10100010111], data is likely to be BUS_RESET.

The contents of the tentative descrambled register 42 are compared in the descrambled pattern comparator 44 to a comparate tentative descrambled pattern accorded by the comparate tentative descrambled pattern register 43.

If an output value of the hypothesis register 22 is [10111010001], data is likely to be BUS_RESET (11111 00000). It is compared by the descrambled pattern comparator 44 whether or not the contents of the tentative descrambled register 42 corresponding to the descrambled received 5-bit scrambled data coincide with BUS_RESET (1111 00000).

The comparate tentative descrambled pattern register 43 generates cyclic codes every reception clock (CLOCK) as a comparate tentative descrambled pattern in the same way as a shift register in a scrambling block.

If the contents of the tentative descrambled register 42 coincide with the comparate tentative descrambled pattern, the received 5-bit scrambled data has been correctly descrambled by the contents of the tentative key stream register 41, that is by the tentative stream. Thus, synchronization with the scrambling block on the transmission side and hence the correct descrambling can be achieved and an output signal DESCRAMBLED DATA equivalent to the input signal PLAIN DATA on the scrambling block on the transmission side can be produced as an exclusive OR output of the exclusive OR circuit 33 by loading the contents of the tentative descrambled register 42 as a new key stream on the keystream register 25.

If the contents of the tentative descrambled register 42 are not coincident with the comparate tentative descrambled pattern, the contents of the tentative descrambled register 42, obtained on descrambling the received 5-bit scrambled data, are not BUS_RESET (11111 00000), even if the output value of the hypothesis register 22 is [1011101000]. Therefore, no new key stream is loaded on the keystream register 25.

Thus, with the present descrambling block, it is checked whether or not the received 5-bit scrambled data has correctly been descrambled, using a key stream obtained as an exclusive OR output of the exclusive OR circuit 34 which takes an exclusive OR of the output data of the scrambled data register 21 in the descrambling block shown in FIG. 14 and the detection pattern sent from the detection pattern register 26, whereby key stream detection accuracy can be improved to effect descrambling accurately.

Thus, with the present embodiment, provided with a converting processing block 3 (4B/5B CONVERTER &ARB. SIGNAL CONVERTER) operating as 4 bit/5 bit converting means for 4B/5B conversion for data and as arbitration signal conversion means for allocating 5-bit symbols other than 5-bit symbols allocated to data in the 4 bit/5 bit converting means to arbitration signals, arbitration signals and packet data can be sent or received as 5-bit code data. Moreover, with the present embodiment, provided with the above-mentioned 4 bit/5 bit converting means, scrambling blocks 4A, 4B (SCRAMBLE 1, SCRAMBLE 2) and descramble blocks 5A, 5B (DESCRAMBLE 1, DESCRAMBLE 2), unneeded radiations in the transmission channel can be prohibited. Therefore, with the present invention, long-distance transmission can be effected using an optical fiber cable or an inexpensive UTP cable as a transmission cable.

Also, if a 5-bit symbol [11111] containing IDLE (11111), that is the clock information, in the idle state in the arbitration in the IEEE 1394 standard most abundantly, the locked state of the PLL can be maintained on the reception side to effect arbitration reliably even in the idle state in the arbitration.

Also, since the scrambling/descrambling means can effect 5-bit parallel processing, processing can be performed using a logic having a lower operating speed than in the case of handling serial data. Also, if a 5-bit symbol allocated to the bus reset state or a 5-bit symbol allocated to the bus reset state in the arbitration of the IEEE 1394 high performance serial bus standard is detected by the scramble-descramble processing means to apply descrambling synchronization, it is possible to effectuate the connection, disconnection and power on/off in the scrambling-on state. Since the bus is in the idle state in the sub-action gap and in the ack gap in the asynchronous transfer mode termed "asynchronous" defined in the IEEE 1394 high performance serial bus standard and in the iso gap in the real-time transfer mode guaranteeing a transfer area termed "isochronous", re-synchronization can be applied at the gap time point by detecting the idle state by the scrambling/descrambling processing means to apply in descrambling synchronization.

Moreover, with the scrambling/descrambling processing means, since re-synchronization is applied only on detection of the 5-bit symbol allocated to the bus reset state or the i5-bit symbol allocated to the idle state, the logic structure can be reduced in size. Also, the scrambling/descrambling processing means synchronizes descrambling after detecting the 5-bit symbol a plural number of times, the risk of mistaken synchronization due to incorrect bit inversion due to noise is diminished to assure reliable processing.

What is claimed is:

1. A data transmission apparatus for sending and receiving data and control codes comprising:

an input/output port connectable to a twisted pair serial data bus;

data conversion means for converting data for transmission from a n-bit code to a m-bit code and for converting received data from a m-bit code to a n-bit code, where n and m are different integers;

control signal converting means for converting a transmission control signal for acquisition of use right of a serial data bus transmission channel of said twisted pair serial data bus connected to said input/output port into a control code composed of a m-bit control code other than m-bit codes allocated to data and for converting received data into a control signal;

scrambling means for performing scrambling on the m-bit control code converted by said control signal converting means, in a manner to reduce undesirable radiation caused by said m-bit control code transmitted on the serial data bus transmission channel, wherein the scrambled control code is output to said input/output port for transmission on said twisted pair serial data bus; and descrambling means for descrambling scrambled signals received via said input/output port to output descrambled signals to said control signal converting means;

wherein said descrambling means includes:
hypothesis means for executing a preset exclusive OR operation on an input scrambled signal received via said input/output port and a temporally shifted version of said scrambled input signal;
first pattern holding means for holding a comparison pattern;
first comparator means for comparing output data of said hypothesis means to a comparison pattern in said first pattern holding means for outputting a preset key pattern corresponding to the results of comparison;
exclusive OR means for performing pre-set exclusive OR calculations on key data derived from the key pattern from said first comparator means and scrambled signals sent thereto via said input/output port to output a m-bit temporary control code;
second pattern holding means holding a descrambled pattern of comparison;
second comparison means for comparing the temporary control code from said exclusive OR means and the descrambled pattern of comparison from said exclusive OR means to output a preset key pattern corresponding to the results of comparison; and
output means for performing pre-set exclusive OR circuit calculations on the key data from said second comparison means and the scrambled signals sent thereto via said input/output port to output a m-bit control code.

2. A data transmission apparatus for sending and receiving data and control codes comprising:
an input/output port connectable to a twisted pair serial data bus;
data conversion means for converting data for transmission from a n-bit code to a m-bit code and for converting received data from a m-bit code to a n-bit code, where n and m are different integers;
control signal converting means for converting a transmission control signal for acquisition of use right of a serial data bus transmission channel of said twisted pair serial data bus connected to said input/output port into a control code composed of a m-bit control code other than m-bit codes allocated to data and for converting received data into a control signal;
scrambling means for performing scrambling on the m-bit control code converted by said control signal converting means, in a manner to reduce undesirable radiation caused by said m-bit control code transmitted on the serial data bus transmission channel, wherein the scrambled control code is output to said input/output port for transmission on said twisted pair serial data bus; and
descrambling means for descrambling scrambled signals received via said input/output port to output descrambled signals to said control signal converting means
wherein said descrambling means includes:
hypothesis means for performing exclusive OR calculations on input scrambled signals received via said input/output port and a temporally shifted version of said scrambled input signals;
pattern holding means holding a comparison pattern;
comparison means for comparing output data of said hypothesis means to the comparison pattern in said pattern holding means to output a preset key pattern responsive to the results of comparison; and
output means for performing preset exclusive OR calculations on key data derived from the key pattern from said comparison means and scrambled signals sent thereto via said input/output port to output a m-bit control code.

3. A data transmission method comprising the steps of:
converting data for transmission from a n-bit code to a m-bit code, where n and m are different integers;
converting received data from a m-bit code to a n-bit code;
converting a transmission control signal for acquisition of use right of a transmission channel of a twisted pair serial data bus connected to an input/output port into a control code composed of a m-bit code other than m-bit codes allocated to data and for converting received data into a control signal;
scrambling the m-bit control code converted in said transmission control signal converting step in a manner to reduce undesirable radiation caused by said m-bit control code transmitted on the serial data bus transmission channel, and outputting the scrambled control code to said input/output port;
transmitting the scrambled control code and converted data for transmission on said twisted pair serial data bus transmission channel; and
descrambling scrambled signals received via said input/output port wherein said descrambling step includes:
a hypothesis step for executing a preset exclusive OR operation on an input scrambled signal received via said input/output port and a temporally shifted version of said scrambled input signal;
a first comparison step for comparing output data of said hypothesis step to a comparison pattern for outputting a preset key pattern corresponding to the results of comparison;
an XOR step for performing pre-set exclusive OR calculations on key data derived from the key pattern and scrambled signals sent thereto via an input/output port to output a m-bit temporary control code;
a second comparison step for comparing the temporary control code from said XOR step and the descrambled pattern of comparison from said XOR step to output a preset key pattern corresonding to the results of comparison; and
an output step for performing pre-set exclusive OR circuit calculations on the key data derived from the key pattern from said second comparison step and the scrambled signals sent thereto via input/output port to output a m-bit control code.

4. A data transmission method comprising the steps of:
converting data for transmission from a n-bit code to a m-bit code, where n and m are different integers;
converting received data from a m-bit code to a n-bit code;
converting a transmission control signal for acquisition of use right of a transmission channel of a twisted pair serial data bus connected to an input/output port into a control code composed of a m-bit code other than m-bit codes allocated to data and for converting received data into a control signal;
scrambling the m-bit control code converted in said transmission control signal converting step in a manner to reduce undesirable radiation caused by said m-bit control code transmitted on the serial data bus transmission channel, and outputting the scrambled control code to said input/output port;

transmitting the scrambled control code and converted data for transmission on said twisted pair serial data bus transmission channel; and descrambling scrambled signals received via said input/output port;

wherein said descrambling step includes a hypothesis step for performing exclusive OR calculations on input scrambled signals received via input/output port and a temporally shifted version of said scrambled input signals;

a comparison step for comparing output data of said hypothesis step to the comparison pattern to output a preset key pattern responsive to the results of comparison; and an output step for performing preset exclusive OR calculations on key data derived from the key pattern from said comparison step and scrambled signals sent thereto via said input/output port to output a m-bit control code.

* * * * *